(12) United States Patent
Tamaki et al.

(10) Patent No.: US 7,076,440 B2
(45) Date of Patent: *Jul. 11, 2006

(54) BUSINESS PROCESSING SYSTEM EMPLOYING A NOTICE BOARD BUSINESS SYSTEM DATABASE AND METHOD OF PROCESSING THE SAME

(75) Inventors: Masato Tamaki, Zushi (JP); Yuji Tsusaka, Inazawa (JP); Naofumi Hosoda, Yokohama (JP); Eiji Takamatsu, Yokosuka (JP); Makoto Ogawa, Kawasaki (JP); Akiko Nagayama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1131 days.

This patent is subject to a terminal disclaimer.

(21) Appl. No.: 09/798,947

(22) Filed: Mar. 6, 2001

(65) Prior Publication Data

US 2001/0008998 A1    Jul. 19, 2001

Related U.S. Application Data

(63) Continuation of application No. 08/856,280, filed on May 14, 1997.

(30) Foreign Application Priority Data

May 15, 1996   (JP)  .................................. 8-120223
Nov. 26, 1996  (JP)  .................................. 8-315254

(51) Int. Cl.
    *G06F 17/60*   (2006.01)
(52) U.S. Cl. .................................. 705/9; 705/7; 705/8
(58) Field of Classification Search ............ 705/36–40, 705/7–9; 235/379; 707/1, 10, 100, 104
    See application file for complete search history.

(56) References Cited

U.S. PATENT DOCUMENTS

| 4,423,313 A | 12/1983 | Tanigati ...................... 235/379 |
| 5,220,674 A | 6/1993 | Morgan et al. ............. 395/800 |
| 5,282,273 A | 1/1994 | Ushio et al. |

(Continued)

FOREIGN PATENT DOCUMENTS

WO    WO 94/18620    *    8/1994

OTHER PUBLICATIONS

Alsop, "Workflow automation integration rquires a large technology toolkit and a structured approach", Computer Technology Review, Supplemental pp. 23-26, Spring/Summer 1994, ISSN: 0278-9647 JRNL Code: CTN.*
Business Editors/Computer Writers, "Open Text announces industry's most powerful, comprehensive intranet suite", Dec. 11, 1996, Dialog file 810, Accession No. 0653486.*

(Continued)

*Primary Examiner*—Frantzy Poinvil
(74) *Attorney, Agent, or Firm*—Mattingly, Stanger, Malur & Brundidge, P.C.

(57) ABSTRACT

A notice board business system database stores therein collectively the contents of all the data heads relating to a series of business processes, and is held in common in the form of a notice board through clients by all the related persons in charge of the tasks. A status change rule sets the data head in which the data input should be completed with respect to each of the task processes. A status watcher refers to both the notice board business system database and the status change rule to make the task process change from the current task process to the next task process when the predetermined data input has been completed in the process in task so as to inform the related client of that the status change has occurred. In addition, the status watcher refers to a status change limit rule for setting the data input completion due date for each of the task processes so as to inform, when the processing due date is drawing near, the related client of that the processing due date is drawing near.

3 Claims, 25 Drawing Sheets

U.S. PATENT DOCUMENTS

| | | | |
|---|---|---|---|
| 5,289,474 A | 2/1994 | Purcell et al. | 371/29.5 |
| 5,291,394 A | 3/1994 | Chapman | 364/401 |
| 5,317,570 A | 5/1994 | Ochiai | 370/94.1 |
| 5,408,662 A | 4/1995 | Katsurabayashi | |
| 5,442,765 A | 8/1995 | Shiga | 395/600 |
| 5,485,615 A | 1/1996 | Wennmyr | 395/700 |
| 5,517,316 A | 5/1996 | Hube | 358/296 |
| 5,539,189 A | 7/1996 | Wilson | 235/379 |
| 5,559,936 A | 9/1996 | Poulter et al. | 395/128 |
| 5,572,438 A | 11/1996 | Ehlers et al. | 364/492 |
| 5,583,778 A | 12/1996 | Wind | 364/464.01 |
| 5,603,033 A | 2/1997 | Joannin | 395/704 |
| 5,657,449 A | 8/1997 | Osaki | 370/357 |
| 5,664,126 A | 9/1997 | Hirakawa et al. | 345/329 |
| 5,684,843 A | 11/1997 | Furukawa et al. | 395/358 |
| 5,696,774 A | 12/1997 | Inoue et al. | 371/37.4 |
| 5,715,020 A | 2/1998 | Kuroiwa et al. | |
| 5,717,493 A | 2/1998 | Ozawa et al. | 358/405 |
| 5,722,405 A | 3/1998 | Goldberg | 128/653.1 |
| 5,774,673 A | 6/1998 | Beuk et al. | 395/200.66 |
| 5,774,731 A | 6/1998 | Higuchi et al. | 395/726 |
| 5,784,633 A | 7/1998 | Petty | 395/880 |

OTHER PUBLICATIONS

Anderson et al. "Getting the most from advanced process control", Cost Engineering v38n11 pp. 31-38 Nov. 1996, Dialog file 485, Accession No. 00598235.*

Alsop, Michael R.; Workflow Automation Integration requires a large technology toolkit and a structured approach, Computer Technology Review, Suppl. p. 23-26.

Open Text announces industry's most powerful, comprehensive intranet suite, Business Wire, p. 12111190.

Progress Software: Progress Software Corporation ships Roundtable Total Software Management System, M@Presswire, pN/A.

F. Yousfi, et al, "A New Architecture for Supporting Group Work in the Field of Health Care", Proceedings Third Workshop on Enabling Technologies: Infrastructure for Collaborative Enterprises, pp. 76-80.

ALLTEL Information Services—Residential Lending Releases ALLTEL Interact Plus Production System, Signs PNC Mortgage as Client, PR Newswire, p. 1209CLM035.

* cited by examiner

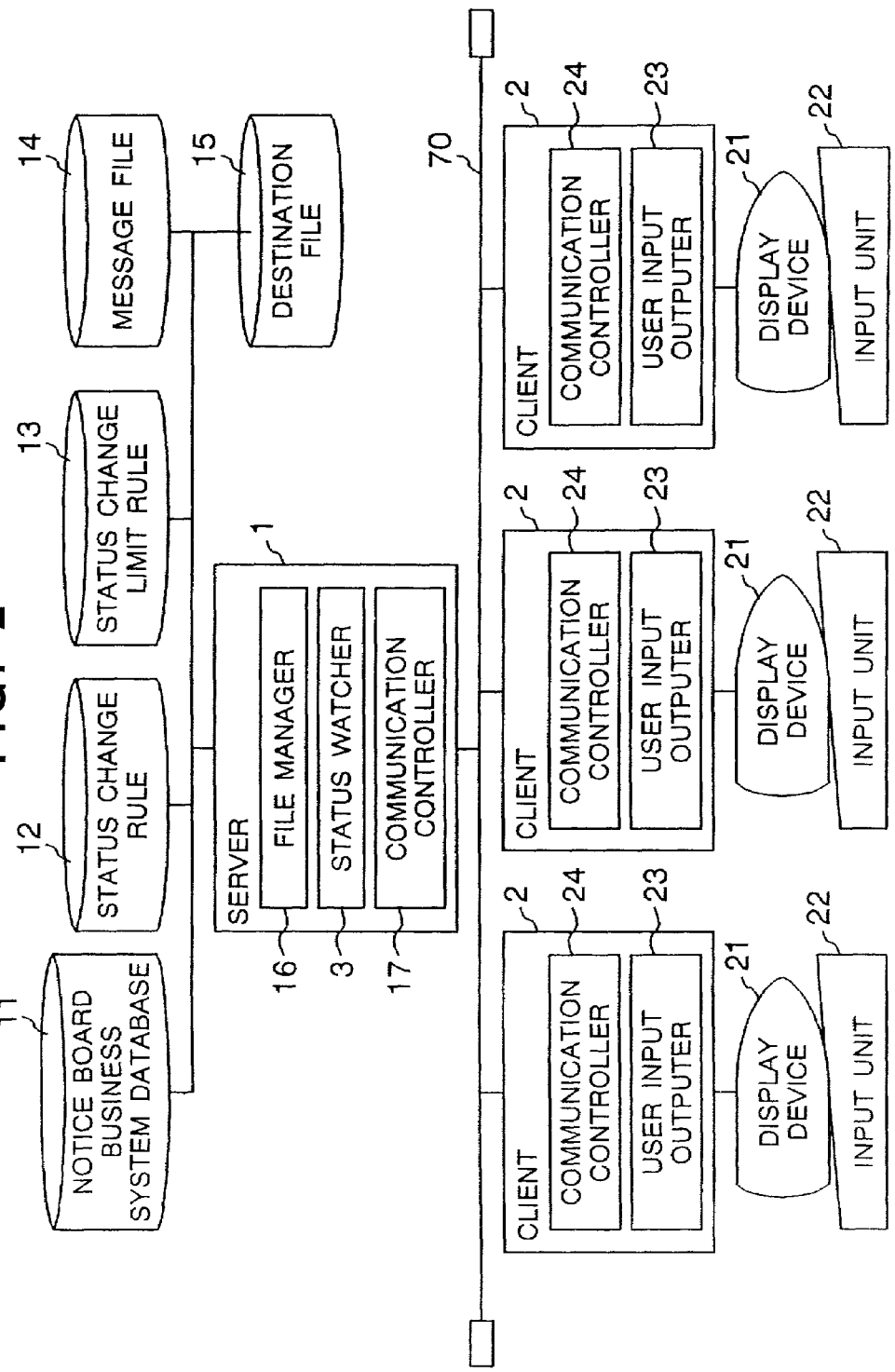

FIG. 3

| HEAD NUMBER | NOTICE BOARD NUMBER | STATUS | CUSTOMER'S NAME | DEGREE | FLAG | PRODUCT NAME | DEGREE | FLAG | NUMBER OF CONTRACT AWARDS | DEGREE | FLAG |
|---|---|---|---|---|---|---|---|---|---|---|---|
| 1 | 001 | CONTRACT AWARD | COMPANY A | DECIDED | | TELEVISION SET | DECIDED | | 10 | DECIDED | |
| 2 | 002 | ESTIMATION | COMPANY B | DECIDED | | VIDEO TAPE RECORDER | DECIDED | | 10 | UNDECIDED | |
| 3 | 003 | DEAL | COMPANY C | DECIDED | | AIR CONDITIONER | UNDECIDED | | 5 | UNDECIDED | |

| APPOINTED DELIVERY DAY | DEGREE | FLAG | PRICE | DEGREE | FLAG | DELIVERY PLACE | DEGREE | FLAG |
|---|---|---|---|---|---|---|---|---|
| 96/01/21 | DECIDED | | 150,000 | DECIDED | | C | UNDECIDED | |
| 96/02/21 | | | 100,000 | UNDECIDED | 1 | | | |

FIG. 4

| HEAD NUMBER | NOTICE BOARD NUMBER | STATUS | CUSTOMER'S NAME | DEGREE | FLAG | PRODUCT NAME | DEGREE | FLAG | NUMBER OF CONTRACT AWARDS | DEGREE | FLAG |
|---|---|---|---|---|---|---|---|---|---|---|---|
| 1 | 001 | DEAL | COMPANY A | DECIDED | | TELEVISION SET | DECIDED | | 10 | DECIDED | |
| 2 | 001 | ESTIMATION | COMPANY A | DECIDED | | TELEVISION SET | DECIDED | | 10 | DECIDED | |
| 3 | 001 | CONTRACT AWARD | | | | | | | | | |

| APPOINTED DELIVERY DAY | DEGREE | FLAG | PRICE | DEGREE | FLAG | DELIVERY PLACE | DEGREE | FLAG |
|---|---|---|---|---|---|---|---|---|
| UNDECIDED | | | UNDECIDED | UNDECIDED | | UNDECIDED | | |
| 96/01/21 | DECIDED | | 150,000 | UNDECIDED | 1 | UNDECIDED | | |

FIG. 5

| HEAD NUMBER | NOTICE BOARD NUMBER | STATUS | CUSTOMER'S NAME | PRODUCT NAME | APPOINTED DELIVERY DAY | PROCESSING DUE DATE | WARNING DAY |
|---|---|---|---|---|---|---|---|
| 1 | 001 | DEAL | COMPANY A | TELEVISION SET | | | |
| 2 | 001 | ESTIMATION | COMPANY A | TELEVISION SET | 96/01/21 | 96/01/05 | 5 DAYS BEFORE DUE DATE |
| 3 | 001 | CONTRACT AWARD | COMPANY A | TELEVISION SET | 96/01/21 | 96/01/10 | 5 DAYS BEFORE DUE DATE |
| | | | | | | | |

| HEAD NUMBER | NOTICE BOARD NUMBER | STATUS | CUSTOMER'S NAME | MESSAGE |
|---|---|---|---|---|
| 1 | 001 | DEAL | COMPANY A | — |
| | | | | DATA INPUT OF DEAL HAS BEEN COMPLETED |
| | | | | PERIOD OF ESTIMATION TASK IS DRAWING NEAR |
| 2 | 001 | ESTIMATION | COMPANY A | — |
| | | | | INPUT OF ESTIMATION DATA HAS BEEN COMPLETED |
| | | | | PERIOD OF CONTRACT AWARD TASK IS DRAWING NEAR |
| 2 | 001 | CONTRACT AWARD | | DATA CHANGES FROM ESTIMATION |

| HEAD NUMBER | NOTICE BOARD NUMBER | STATUS | DESTINATION SECTION | NAME OF PERSON IN CHARGE OF TASK PROCESS |
|---|---|---|---|---|
| 1 | 001 | DEAL | SECTION A | D |
| 2 | 001 | ESTIMATION | SECTION A | D |
| 3 | 001 | CONTRACT AWARD | SECTION B | E |
| | | | | |

FIG. 8a

NOTICE BOARD

| NOTICE BOARD NUMBER | CUSTOMER'S NAME |
|---|---|
| 001 | COMPANY A |

| PERSON IN CHARGE OF RECEIPT |
|---|
| B |

| STATUS | PRODUCT NAME | NUMBER OF CONTRACT AWARDS | APPOINTED DELIVERY DAY | PRICE | DELIVERY PLACE |
|---|---|---|---|---|---|
| IN ESTIMATION | TELEVISION SET | 10 | 09/01/21 | 150,000 | |

FIG. 8b

NOTICE BOARD

| NOTICE BOARD NUMBER | CUSTOMER'S NAME |
|---|---|
| 001 | COMPANY A |

| PERSON IN CHARGE OF RECEIPT |
|---|
| B |

| STATUS | PRODUCT NAME | NUMBER OF CONTRACT AWARDS | APPOINTED DELIVERY DAY | PRICE | DELIVERY PLACE |
|---|---|---|---|---|---|
| CONTRACT AWARD | TELEVISION SET | 10 | 09/01/21 | 150,000 | C |

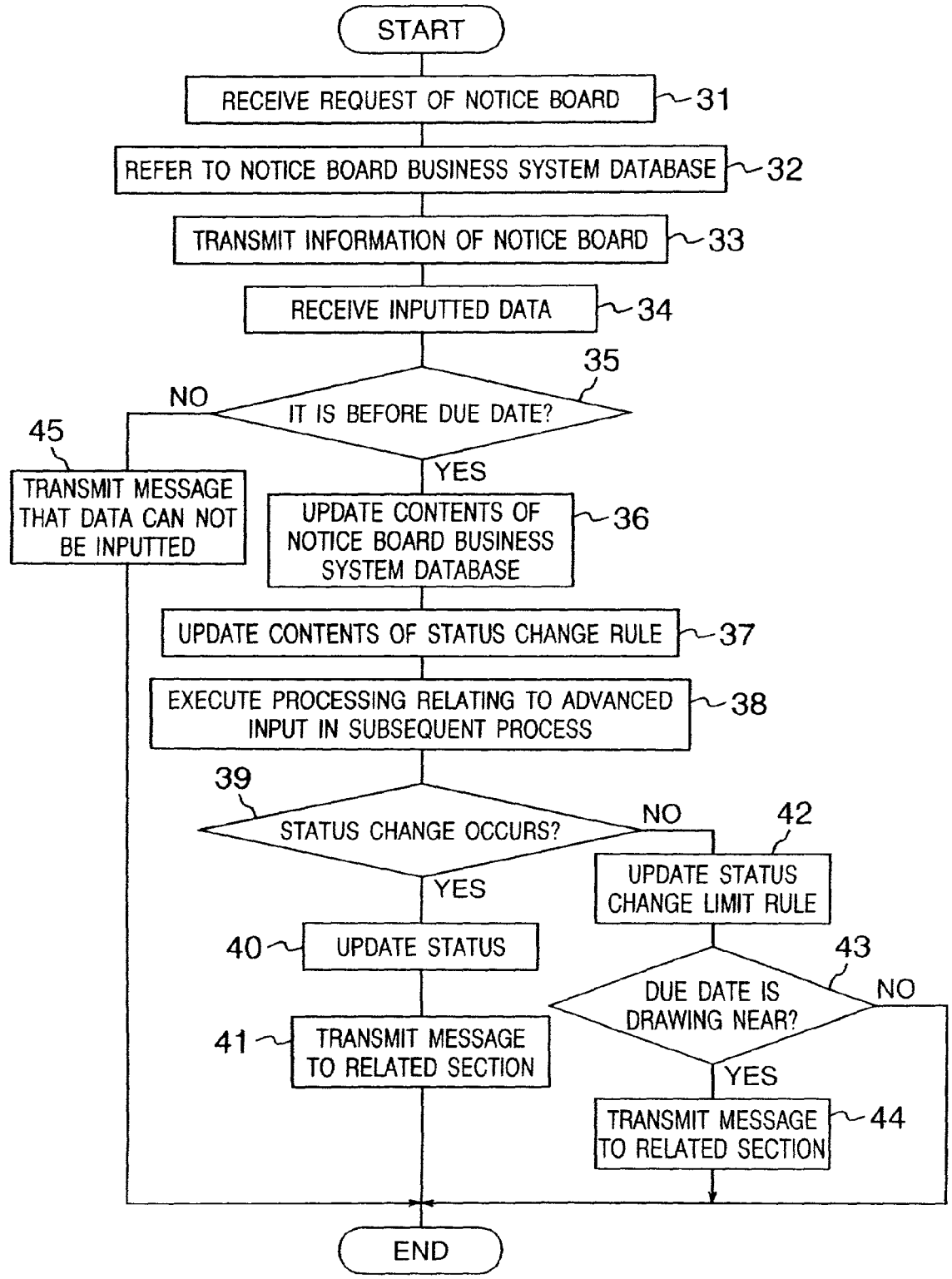

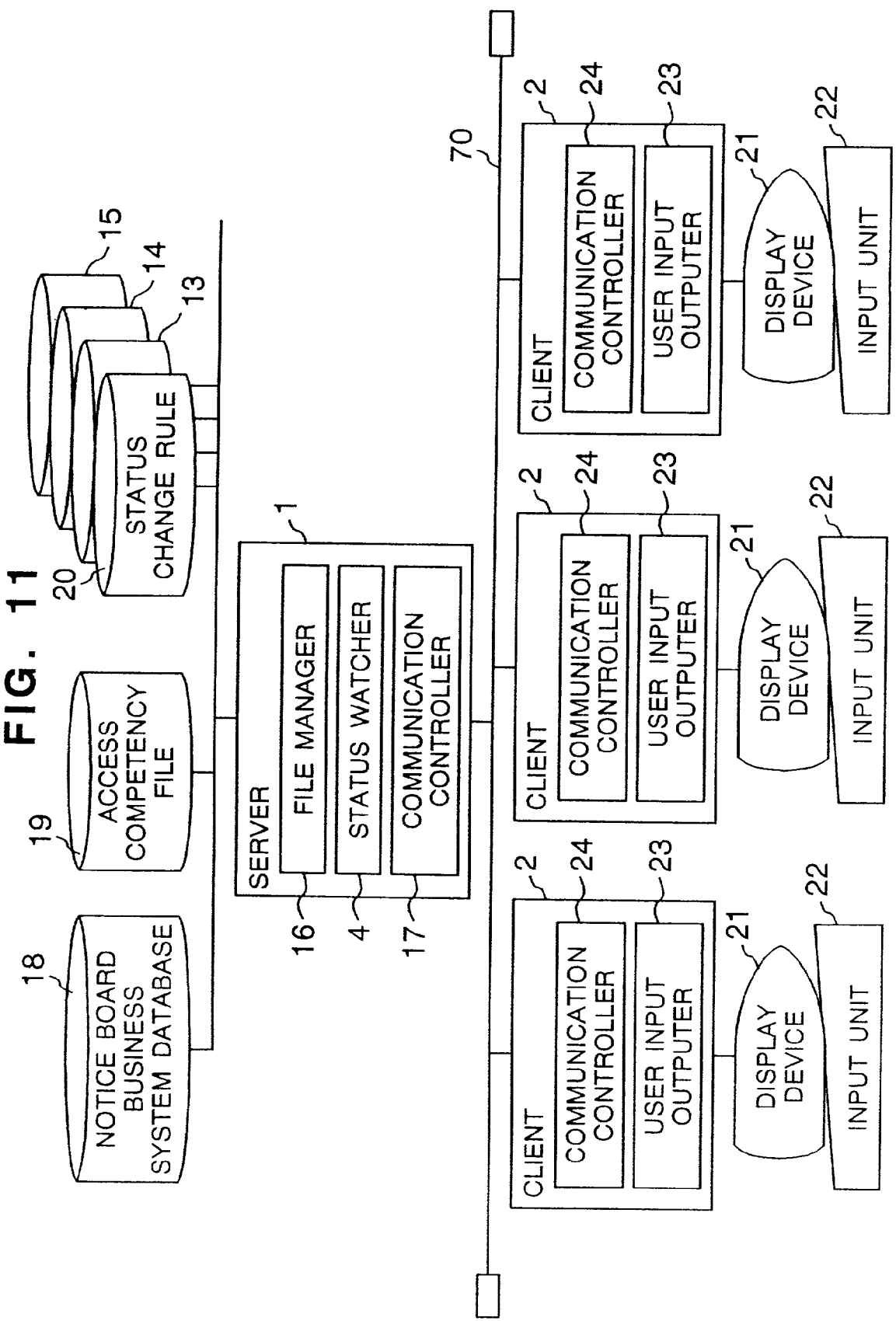

| HEAD NUMBER | NOTICE BOARD NUMBER | STATUS | CUSTOMER'S NAME | CONFE-RENCE | DECI-SION | GET NOTICE | ADVANCED INPUT | PRODUCT NAME | CONFE-RENCE | DECI-SION | GET NOTICE | ADVANCED INPUT |
|---|---|---|---|---|---|---|---|---|---|---|---|---|
| 1 | 012 | PRICE ESTIMATION | COMPANY A | 0 | 1 | 1 | 0 | TELEVISION SET | 0 | 1 | 1 | 0 |
| 2 | 012 | PRICE ESTIMATION | COMPANY A | 0 | 1 | 1 | 0 | VIDEO TAPE RECORDER | 0 | 1 | 1 | 0 |
| 3 | 012 | PRICE ESTIMATION | COMPANY A | 0 | 1 | 1 | 0 | AIR CONDITIONER | 0 | 1 | 1 | 0 |

| AMOUNT | CONFE-RENCE | DECISION OF REQUEST | DECISION OF REPLY | HOLDING CONFE-RENCE | GET NOTICE OF REQUEST | GET NOTICE OF REPLY | GET NOTICE OF OTHER SECTION | ADVANCED INPUT |
|---|---|---|---|---|---|---|---|---|
| 5 | 1 | 1 | 0 | 0 | 0 | 1 | 0 | 0 |
| 5 | 1 | 1 | 0 | 0 | 0 | 1 | 0 | 0 |
| 1 | 1 | 1 | 0 | 0 | 0 | 1 | 0 | 0 |

FROM FIG.12a

| DELIVERY PRICE | CONFE-RENCE 181 | DECISION OF REQUEST 184 | DECISION OF REPLY 185 | HOLDING CONFE-RENCE 186 | GET NOTICE OF REQUEST 187 | GET NOTICE OF REPLY 188 | GET NOTICE OF OTHER SECTION 189 | ADVANCED INPUT 115 |
|---|---|---|---|---|---|---|---|---|
| 150,000 | 1 | 1 | 0 | 0 | 0 | 1 | 0 | 0 |
| 100,000 | 1 | 1 | 0 | 0 | 0 | 1 | 0 | 0 |
| 200,000 | 1 | 1 | 0 | 0 | 0 | 1 | 0 | 0 |

| APPOINTED DELIVERY DAY | CONFE-RENCE 181 | DECISION OF REQUEST 184 | DECISION OF REPLY 185 | HOLDING CONFE-RENCE 186 | GET NOTICE OF REQUEST 187 | GET NOTICE OF REPLY 188 | GET NOTICE OF OTHER SECTION 189 | ADVANCED INPUT 115 |
|---|---|---|---|---|---|---|---|---|
| 06/10 | 1 | 1 | 0 | 0 | 0 | 1 | 0 | 0 |
| 06/10 | 1 | 1 | 0 | 0 | 0 | 1 | 0 | 0 |
| 06/10 | 1 | 1 | 0 | 0 | 0 | 1 | 0 | 0 |

FIG. 13a

| | | NOTICE BOARD NUMBER | CUSTOMER'S NAME | CONFERENCE FLAG | DECISION FLAG | GET NOTICE FLAG | PRODUCT NAME | CONFERENCE FLAG | DECISION FLAG | GET NOTICE FLAG |
|---|---|---|---|---|---|---|---|---|---|---|
| PERSON IN CHARGE OF BUSINESS | WRITING | — | APPROVAL | — | APPROVAL | — | APPROVAL | — | APPROVAL | — |
| | REFERENCE | APPROVAL | APPROVAL | — | APPROVAL | APPROVAL | APPROVAL | — | APPROVAL | APPROVAL |
| SECTION CHIEF OF BUSINESS | WRITING | — | — | — | — | APPROVAL | — | — | — | APPROVAL |
| | REFERENCE | APPROVAL | — | — | APPROVAL | APPROVAL | APPROVAL | — | APPROVAL | — |
| PERSON IN CHARGE OF STORE-HOUSE | WRITING | — | APPROVAL | — | APPROVAL | — | APPROVAL | — | APPROVAL | — |
| | REFERENCE | APPROVAL | APPROVAL | — | — | — | — | — | — | — |

← FROM FIG.13a

| AMOUNT | CONFE-RENCE FLAG | DECISION FLAG OF REQUEST | DECISION FLAG OF REPLY | HOLDING CONFERENCE FLAG | GET NOTICE FLAG OF REQUEST | GET NOTICE FLAG OF REPLY | GET NOTICE FLAG OF OTHER SECTION |
|---|---|---|---|---|---|---|---|
| APPROVAL | — | APPROVAL | — | — | APPROVAL | — | — |
| APPROVAL | — | APPROVAL | APPROVAL | — | — | APPROVAL | APPROVAL |
| — | — | — | APPROVAL | — | — | — | — |
| APPROVAL | — | APPROVAL | APPROVAL | — | — | APPROVAL | — |
| APPROVAL | — | — | APPROVAL | — | — | — | — |
| APPROVAL | — | APPROVAL | APPROVAL | — | APPROVAL | — | APPROVAL |

FIG. 14a

| NOTICE BOARD NUMBER | CUSTOMER'S NAME | DECISION FLAG 161 | DEGREE FLAG 162 | ADVANCED GET NOTICE FLAG 163 | PRODUCT NAME | DECISION FLAG 161 | DEGREE FLAG 162 | ADVANCED GET NOTICE FLAG 163 | ... |
|---|---|---|---|---|---|---|---|---|---|
| 012 | COMPANY A | 1 | 1 | 0 | TELEVISION SET | 1 | 1 | 0 | ... |
| ... | ... | ... | ... | ... | ... | ... | ... | ... | ... |

FIG. 14b

| NOTICE BOARD NUMBER | CUSTOMER'S NAME | DECISION FLAG 161 | GET NOTICE FLAG 164 | PRODUCT NAME | DECISION FLAG 161 | GET NOTICE FLAG 164 | ... |
|---|---|---|---|---|---|---|---|
| 012 | COMPANY A | 0 | 1 | TELEVISION SET | 0 | 1 | ... |
| ... | ... | ... | ... | ... | ... | ... | ... |

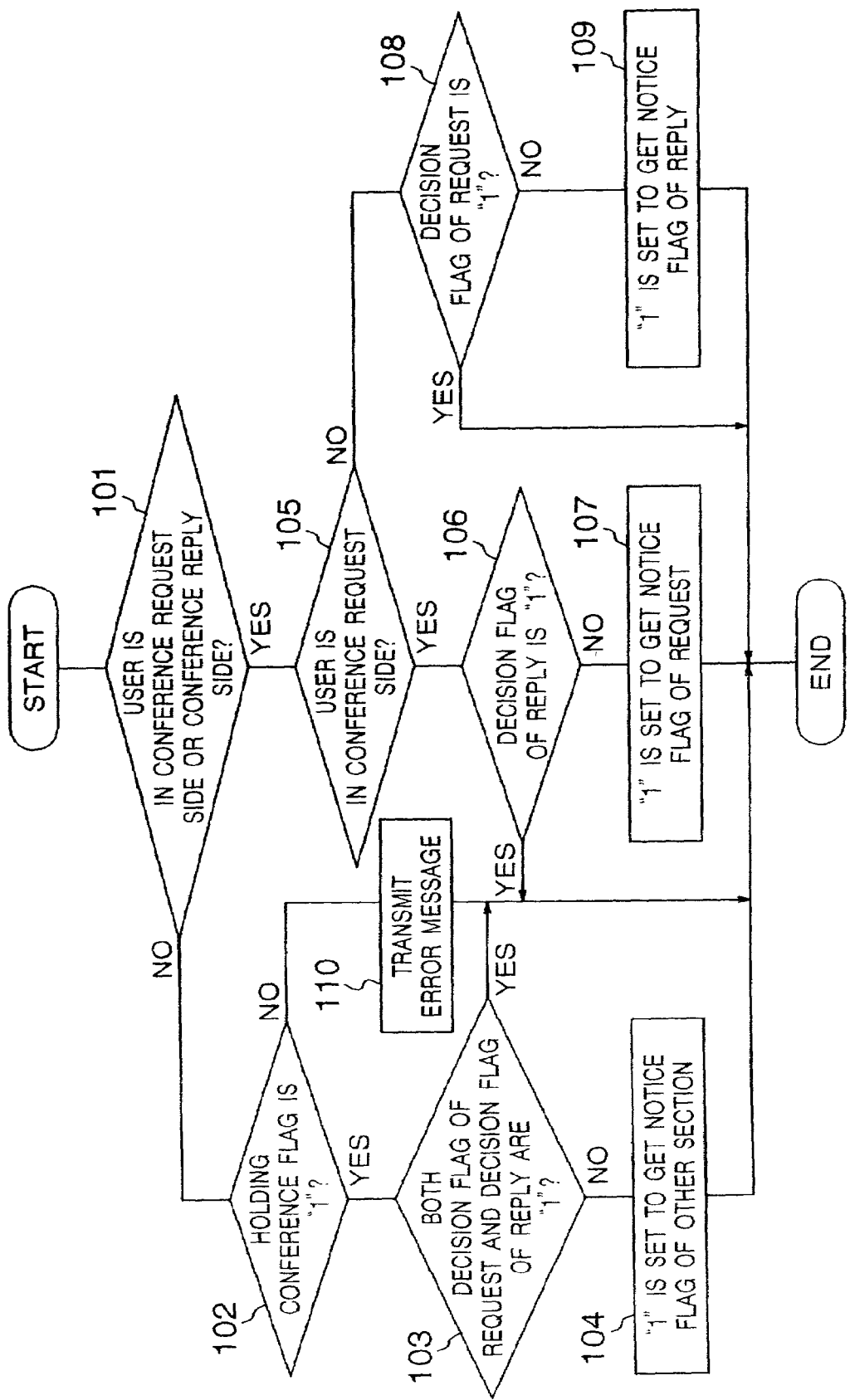

FIG. 19

```
ESTIMATION/CONTRACT AWARD INPUT PICTURE

NOTICE BOARD                              CUSTOMER'S
   NUMBER                                    NAME
    012                                  ⦿ COMPANY A

PRODUCT                      DELIVERY
   NAME         AMOUNT           PRICE
⦿ TELEVISION       ○   5      ○  150,000    APPOINTED
     SET                                   DELIVERY DAY
⦿ VIDEO TAPE      ○   5      ○  100,000    ○  6/10
   RECORDER
⦿    AIR          ○   1      ○  200,000
  CONDITIONER
```

FIG. 20

```
ESTIMATION/CONTRACT AWARD INPUT PICTURE

NOTICE BOARD                              CUSTOMER'S
   NUMBER                                    NAME
    012                                  ⦿ COMPANY A

PRODUCT                      DELIVERY
   NAME         AMOUNT           PRICE
⦿ TELEVISION      ○   5      ○  150,000    APPOINTED
     SET                                   DELIVERY DAY
⦿ VIDEO TAPE     ○   5      ○  100,000    ○  6/10
   RECORDER
⦿    AIR         ○   1      ○  200,000
  CONDITIONER
```

FIG. 21

```
ESTIMATION/CONTRACT AWARD INPUT PICTURE
```

| NOTICE BOARD NUMBER | CUSTOMER'S NAME |
|---|---|
| 012 | ⦿ COMPANY A |

| | PRODUCT NAME | | AMOUNT | | DELIVERY PRICE | APPOINTED DELIVERY DAY |
|---|---|---|---|---|---|---|
| ⦿ | TELEVISION SET | ○ | 5 | ○ | 150,000 | |
| ⦿ | VIDEO TAPE RECORDER | ○ | 5 | ○ | 100,000 | ○ 6/10 |
| ⦿ | AIR CONDITIONER | ○ | 1 | ○ | 200,000 | |

FIG. 22

```
ESTIMATION/CONTRACT AWARD INPUT PICTURE
```

| NOTICE BOARD NUMBER | CUSTOMER'S NAME |
|---|---|
| 012 | ⦿ COMPANY A |

| | PRODUCT NAME | | AMOUNT | | DELIVERY PRICE | APPOINTED DELIVERY DAY |
|---|---|---|---|---|---|---|
| ⦿ | TELEVISION SET | ○ | 5 | ○ | 150,000 | |
| ⦿ | VIDEO TAPE RECORDER | ○ | 5 | ○ | 100,000 | ○ 6/10 |
| ⦿ | AIR CONDITIONER | ○ | 1 | ○ | 200,000 | |

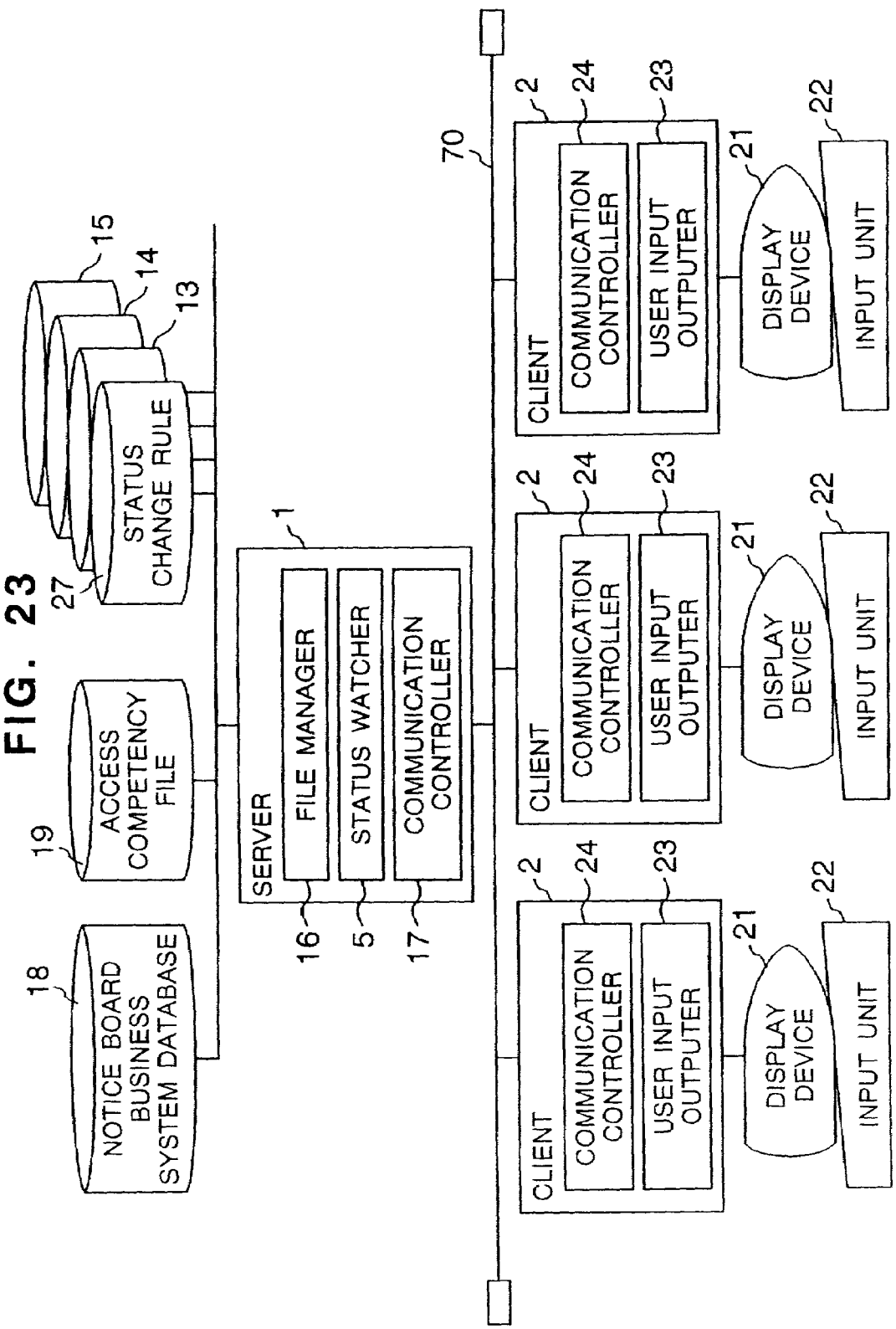

FIG. 24

| 27 271 | 272 | 273 | 274 | 275 | 276 | 277 |
|---|---|---|---|---|---|---|
| PROCESS | NOTICE BOARD NUMBER | CUSTOMER'S NAME | PRODUCT NAME | AMOUNT | DELIVERY PRICE | APPOINTED DELIVERY DAY |
| DEAL | 001 | — | — | — | — | — |
| STOCK CONFIRMATION | 001 | ALL | EACH | EACH | — | — |
| STRUCTURE ESTIMATION | 001 | ALL | ALL | ALL | — | — |
| PRICE ESTIMATION | 001 | ALL | ALL | ALL | ALL | — |
| CONTRACT AWARD | 001 | ALL | ALL | ALL | ALL | ALL |

BUSINESS PROCESSING SYSTEM EMPLOYING A NOTICE BOARD BUSINESS SYSTEM DATABASE AND METHOD OF PROCESSING THE SAME

This is a continuation of application Ser. No. 08/856,280, filed May 14, 1997.

CROSS-REFERENCE TO RELATED APPLICATION

The present invention relates to a copending U.S. patent application Ser. No. 06/622630 filed on Mar. 27, 1996 entitled "METHOD AND APPARATUS FOR TRANSMITTING DATA IN CORRESPONDENCE TO A PROGRESS STAGE OF A SERIES OF BUSINESS PROCESSINGS" by N. HOSODA et al. and assigned to the present assignee, the contents of which are incorporated herein by reference.

BACKGROUND OF THE INVENTION

The present invention relates in general, in a work flow constituted by a sequence of a plurality of task processes, to a system in which data is inputted to an electronic computer as the result of the business processings through the task processes, and more particularly to a business processing system in which all the persons in charge of respective task processes hold in common a single notice board business system database and a method of processing the same.

In general, the business processing may be carried out in many cases through the business processing process constituted by a sequence of a plurality of task processes. When the process proceeds from a certain task process to a next task process, the data is delivered one after another through chits, documents and the like, thereby carrying out a series of business processes. In a work flow system utilizing an electronic computer, the information which is arranged in chits or documents is stored in a memory provided in the electronic computer and is delivered to the person in charge of the next task process via the data transmission through a network.

FIG. 1 is a schematic view showing an example of a flow of a business process in the selling business. In the business process shown in FIG. 1, after the selling action has been carried out for a customer in order to carry out a deal, the specification, the price, the appointed delivery day and the like of a product are concretely estimated. Then, after having made contract with the customer, the arrangements for material supply, design and manufacture of a product, security of the stock, carrying-in step of a product, and the like for the associated sections are carried out. In addition, after a product has been delivered to a customer and then the acceptance is completed, the request and recovery of the price are carried out. The stages such as a deal and estimation correspond to task processes, respectively. According to the prior art, the delivery of the data from a certain task process to the next task process is carried out on the basis of the information which is arranged in chits. For this reason, the transmission of the information to the person in charge of the next task process is carried out at a time point when all the data on the chits becomes complete. Therefore, the person in charge of the subsequent task process can not be aware, until all the data on the chits has been decided, of the contents thereof. For example, in the example shown in FIG. 1, in the case where even if the contents of products are not decided yet in the steps of a deal and estimation, the person in charge of the delivery management wants to know the data of products as the undecided information, in the conventional method, the persons in charge of the subsequent task processes can not know that information at all. In addition, the data heads of the data which is inputted as the result of the business processing to an electronic computer are not necessarily decided in accordance with the flow of the business processing, and also which data head the data is decided from is not necessarily uniquely determined. For example, if the negotiations of the product specification progresses advancedly in the step of estimation in FIG. 1, then the data heads relating thereto are advancedly decided. Conversely, if the negotiations of the appointed delivery day progresses advancedly, then the data heads relating thereto are advancedly decided. According to the conventional method, however, if when the data heads have been decided, this fact is intended to be reported to the person in charge thereof in the related section, then the person in charge of the task process of interest needs to specify both the destination and data of the person in charge thereof in the related section on all such occasions in order to carry out the transmission processing, which results in the burden imposed on the person in charge of the task process being increased. This is a problem. In addition, according to the conventional method, since the so-called repetitive input is carried out in which the various kinds of chits are produced through a series of business processes and also the same data is repeatedly inputted to the different chits, the possibility that the mistake in the input is caused is increased and also the time required for inputting the needless data is taken.

SUMMARY OF THE INVENTION

As described above, according to the prior art, since the transmission of the data from a certain task process to the next task process is carried out basically in chits, if all the data on the chits does not become complete, the data is not transmitted to the next task process. Therefore, even when the person in charge of the subsequent task process intends to advance the task advancedly, that person can not carry out the task and hence the task efficiency is not enhanced. This is another problem. Then, when the decided or undecided data is intended to be transmitted to the person in charge of the subsequent task process against such a serial flow of the business processing, the burden is forcedly imposed on the person in charge of the task process of interest. This is still another problem. In addition, there arises yet another problem of the mistake in the input and the reduction in the task efficiency due to the repetitive input of the data to the chits.

In the light of the foregoing problems associated with the prior art, the present invention was made in order to solve the foregoing problems, and it is therefore an object of the present invention to make that the arbitrary person in charge of the task process makes reference to the necessary data at an arbitrary time point possible in a business processing system.

It is another object of the present invention to reduce the transmission/reception of the data when the task process changes from a certain task process to the next task process as much as possible, reduce the burden imposed on the person in charge of the task process resulting therefrom and also to reduce the load on a network.

It is still another object of the present invention to make that the person in charge of the subsequent task process makes reference to data advancedly possible, permit the operation of inputting data advancedly by the person in charge in the subsequent task process in order to enhance the task efficiency, and also to enable the confusion which is easy to occur at this time to be prevented.

A business processing system according to the present invention may provide that the contents of all the data heads relating to a series of business process are epitomized in a database so that all the persons in charge of the task processes relating thereto can hold this database in common. In this connection, the concept of the process which is currently in task in accordance with a sequence of the task processes is preserved so that the person in charge of the current task process can carry out mainly the data input and the data update, and the persons in charge of the subsequent task processes can make reference mainly to the data. In addition, with respect to each of the task processes, the status of the data which should be fulfilled in order that the task process may change is defined in the form of a status change value every data head. Whether or not the task process change is judged on the basis of the status change value. When it is judged that the task process has changed, this fact that the task process has changed is reported to the person in charge of the task process the task of which can be newly carried out.

In a preferred aspect, in the business processing system according to the present invention, an identifier for representing the current task process is provided in the database. At the time when the task process has changed, the identifier of interest is updated to an identifier for representing the task process the task of which can be newly carried out and then the task process of interest is made change from the current task process to the next task process.

In a more preferred aspect, in the business processing system according to the present invention, with respect to each of the task processes having the respective processing due dates, the due date when the data input should be completed is set. Then, when the current task process has reached the predetermined period before the due date, the person in charge of the task process of interest is informed of that the due date is drawing near. In addition, the advanced input of the data by any person in charge of the subsequent task process is permitted, and the flag is set in correspondence to the data head which has been advancedly inputted. When the data input is requested from the person in charge of the preceding task process, the undecided data heads are detected in which the flag is set, and then the persons in charge of the subsequent task processes are informed of that the data change due to the preceding process has occurred. As a result, the data which has been inputted by any person in charge of the subsequent task process can be reviewed.

In addition, in the business processing method according to the present invention, the information representing whether or not the persons in charge of a plurality of task processes have determined on their intentions with respect to the data of the respective data heads is held in correspondence to a part of the data heads of the database. When all the persons in charge of a plurality of task processes have determined on their intentions with respect to the data of the respective data heads, the data in the work flow is regarded as being decided, and also the persons in charge of the task processes of interest are informed of that the data has been decided.

The business processing method according to the present invention may provide that the information representing whether or not the data of the date head which is undecided with its degree is advancedly taken over is held in correspondence to the data heads of the database and when the undecided data is advancedly taken over, this fact is reported to the person in charge of the task process of interest.

BRIEF DESCRIPTION OF THE DRAWINGS

The above and other objects as well as advantages of the present invention will become clear by the following description of the preferred embodiments of the present invention with reference to the accompanying drawings, wherein:

FIG. 2 is a block diagram showing a configuration of a business processing system in a first embodiment;

FIG. 3 is a schematic view showing an example of the data form of a notice board business system database;

FIG. 4 is a schematic view showing an example of the data form of a status change rule;

FIG. 5 is a schematic view showing an example of the data form of a status change limit rule;

FIG. 6 is a schematic view showing an example of the data form of a message file;

FIG. 7 is a schematic view showing an example of the data form of an address allocation file;

FIGS. 8a and 8b are respectively schematic views each showing a display example of a notice board in the first embodiment;

FIG. 9 is a flow chart showing a processing flow in a status watcher;

FIG. 11 is a block diagram showing a business processing system in a second embodiment;

FIG. 12 is a schematic view showing an example of the data form of a notice board business system database;

FIG. 13 is a schematic view showing an example of the data form of an access competency file;

FIGS. 14a and 14b are respectively schematic views each showing the form of data which is transmitted between a server and a client;

FIG. 18 is a flow chart showing a processing flow of the processing of setting a get notice flag;

FIGS. 19, 20, 21 and 22 are respectively schematic views each showing a displayed example of notice board data which is displayed on a display device;

FIG. 23 is a block diagram showing a configuration of a business processing system in a third embodiment;

FIG. 24 is a schematic view showing an example of the data form of a status change rule.

DESCRIPTION OF THE PREFERRED EMBODIMENTS

Figure 1:
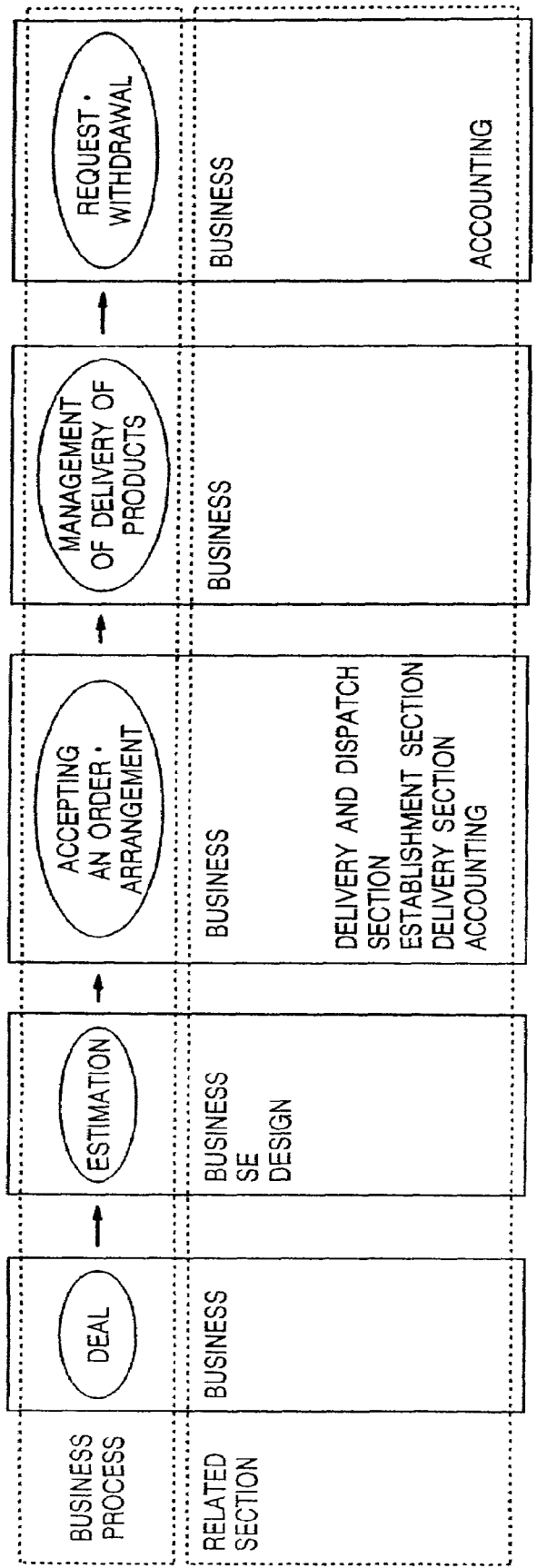
FIG. 1 is a schematic view of a business flow showing an example of a business process.

The preferred embodiments of the present invention will hereinafter be described in detail with reference to the accompanying drawings.

First Embodiment

FIG. 2 is a block diagram showing a configuration of a business processing system of a first embodiment according to the present invention. The business processing system in the present embodiment includes a file relating to a database which serves to store therein data on the business, a server 1 for monitoring the database, and a plurality of clients which are connected to the server 1 through a network 70 and each of which serves to input and update data to and in the database. The clients 2 are terminal units which are installed in the respective sections for carrying out the business processings. A notice board business system database 11 is a database which serves to store therein the newest data relating to the business processing and which acts as a notice board for the client 2. A status change rule 12 is a file which serves to define the processing of which task process will be completed in a flow of the business processing on the basis of the data input situation of the data heads on the notice board business system database 11 and the degree of the inputted data. A status change limit rule 13 is a file which serves to define the due date when the processing should be completed with respect to each of the task processes. A message file 14 is a file which serves to store therein a message for being reported to the related section. A destination file 15 is a file which serves to registrate the destination to which a message is sent. The notice board business system database 11, the status change rule 12, the status change limit rule 13, the message file 14 and the destination file 15 are stored in a memory connected to the server 1. The management of the operation for accessing to the database and these files is carried out by a file manager 16.

A status watcher 3 of the server 1 judges whether or not the status should be changed from the current task process to the next task process by referring to both the notice board business system database 11 and the status change rule 12. If it is judged that the status should be changed from the current task process to the next task process, then the message is sent to the related section by referring to both the message file 14 and the destination file 15. In addition, the status watcher 3 judges whether or not the due date of the processing is drawing near with respect to the current task process by referring to the status change limit rule 13. If so, then the status watcher 3 transmits the warning message to the related section by referring to both the message file 14 and the destination file 15. In addition, the status watcher 3 monitors whether or not the person in charge of the task process subsequent to the current task process has inputted the data advancedly and sets a flag to the data head the data of which has been inputted advancedly, and when the person in charge of the current task process changes hereafter the data, transmits the message for notice to the person in charge of the subsequent task process by referring to both the message file 14 and the destination file 15. A communication controller 17 is a controller for controlling transmission/reception of the data or the message to/from the associated client 2 through the network 70.

A display device 21 of the client 2 is a device for displaying thereon the notice board and the message and is concretely comprised of a CRT display device or the like. An input unit 22 is a unit for inputting therethrough the data to the notice board and is comprised of a keyboard or a mouse for example. A user input outputer 23 is a processing unit for realizing the user interface and serves to display the data which has been received from the server 1 on the display device 21 in accordance with the form of the display screen which is previously designed, and also to transmit the data which has been inputted through the input unit 22 to the server 1. The communication controller 24 is a controller for controlling transmission/reception of the data or the message to/from the server 1 through the network 70. Each of the server 1 and the client 2 is comprised of an information processor including a personal computer and a work station. The status watcher 2, the file manager 16, the communication controller 17, the user input outputer 23 and the communication controller 24 are realized by either the hardware of the information processor or executing a program stored in the memory thereof. Incidentally, the database, the file and the file manager 16, from the notice board business system database 11 down, may be realized by another server which is connected to the server 1 through the network.

FIG. 3 is a schematic view showing an example of the data form of the notice board business system database 11. The notice board business system database 11 holds at least one set of notice board data. Each of the notice board data includes a head number 110, a notice board number 111, status 112, a plurality of data heads 113, and attribute information for showing the status of the data which is registrated, in correspondence to each of the data heads, in the associated data head. The head number 110 represents the number of the record within the table. The notice board number 111 is the number as an identifier which is assigned in order to distinguish the associated notice board from other notice boards which are stored in the notice board business system database 11. The status 112 is an identifier of the task process which is used to set the name of each of the task processes in order of sequence of the task processes through the flow of the business process. The data head 113 is a head to which the data is inputted as the result of the business processing. By the data head is, for example, meant the head on the chit which is utilized in the general business processing, and the data which is set in the data head 113 corresponds to the data which is entered in the chit. In the present embodiment, as a concrete example of the data heads, there are exemplified "customer's name", "product name", "the number of contract awards", "the appointed delivery day", "price" and "delivery place". Each of the data heads 113 is given the attribute information for representing the status of the data given thereto. There are provided in the attribute information a degree 114 for showing whether the data which has been inputted to the corresponding data head is already decided or undecided yet, and a flag 115 to which "1" is set when the data is advancedly inputted by the person in charge of the subsequent task process. In the present embodiment, the update of the data head in which "decided" is set to the degree 114 is prohibited as a general rule. Incidentally, the notice board data is information at least a part of which can be referred by each client 20, as in the so-called notice board, with respect to the business which is carried out in the business processing system. The notice board data is formed so as to correspond to a series of individual businesses which are processed on the business processing system.

FIG. 4 is a schematic view showing an example of the data form of the status change rule 12. The status change rule 12 defines the processing of which task process should be completed on the basis of the data input situation of the data heads and the degree of the inputted data, and also shows the hysteresis of the data input. As understood from the figure, the status change rule 12 has the substantially same form as that of the notice board business system database 11. The notice board business system database 11 holds only the newest data with respect to the current task process, whereas the status change rule 12 has a record every task process and also holds the data which is inputted and updated in the respective task processes. The contents of the notice board business system database 11 match the contents of the corresponding task process of the status change rule 12. To the data head in which no data input is required in each of the task processes, in the initial state, "undecided" is set. In the status change rule 12, in the initial status, the column other than the status 121, and the data heads to which "undecided" is set are blank columns. For example, in the task process of "deal", in the initial state, "undecided" is set to "the appointed delivery day", "price" and "delivery place" out of the data heads 122, whereas the data heads of "customer's name", "product name" and "the number of contract awards" have the blank columns. Therefore, since if the data is inputted to the data heads of "customer's name", "product name" and "the number of contract awards", the data heads which are hereabove blank columns disappear, the process of "deal" will be completed. Likewise, since the data is inputted to all the data heads other than "delivery place" in the process of "estimation", the data heads which are hereabove blank columns, the process of "estimation" will be completed. In the present embodiment, the task process can not change from the current task process to the next task process unless all the degrees 23 of the data heads are decided.

FIG. 5 is a schematic view showing an example of the data form of the status change limit rule 13. Similarly to the status 111, the status 131 is such that the task processes constituting the business flow are arranged in order. The customer's name, the product name and the appointed delivery day are the data heads relating to the business. The due date 132 of the processing is the closing day when the processing should be completed with respect to the process of interest. The warning day 133 represents how many days before the due date 132 of the processing the warning message should be issued when the due date of the processing is drawing near. Both the head number and the notice board number are the same as those of the notice board business system database 11. In the initial state, only the process names of the status 131 and the warning day 133 are set. The data head relating to the business is reflected with its contents in correspondence to the update of the notice board business system database 11. The due date 132 of the processing is set by an manager.

FIG. 6 is a schematic view showing an example of the data form of the message file 14. Similarly to the status 111, the status 141 is such that the processes constituting the business flow are arranged in order. To the message 142 is set a message which is issued when the task process changes with respect to each of the task processes, when the due date of the processing is drawing near and when data is changed by the person in charge of the preceding task process.

FIG. 7 is a schematic view showing an example of the data form of the destination file 15. Similarly to the status 111, a status 151 is such that the processes constituting the business flow are arranged in order. Both the destination section and the name of the person in charge of the task process when sending the message are set as the destination information in the destination file 15 so as to correspond to the associated process. In addition, the address of the electronic computer originated mail (E-COM) may also be set in the destination information.

FIGS. 8a and 8b are respectively schematic views each showing an example of the data form of the notice board which is displayed on the display device 21 of the client 2. The values of the data heads of the notice board business system database 11 are displayed on the notice board. FIG. 8a corresponds to the status in which the data input has been completed with respect to the data heads other than the delivery place and also shows that the status is "in estimation". In addition, FIG. 8b corresponds to the status in which the data input has been completed with respect to all the data heads and also shows that in the status, "contract award" has been completed. The attributes of the data heads, i.e., the distinction of decided/undecided of the degree, and existence and non-existence of the flag can be distinguished on the basis of the displayed colors of the data heads, existence and non-existence of the blinking display, and the like.

FIG. 9 is a flow chart showing the processing flow in the status watcher 3. When specifying the notice board number, the process name, the customer's name and the like through the communication controller 24 and the communication controller 17 from the user input outputer 23 of the client 2 to receive the request from the notice board (Step 31), the status watcher 3 retrieves the notice board business system database 11 in order to fetch the information of the notice board which has been specified with the notice board number (Step 32). Then, the status watcher 3 transmits the information of the notice board thus fetched to the associated client 2 through the communication controller 17 (Step 33). The user input outputer 23 of the associated client 2 opens the notice board to display the information of the notice board on the display device 21.

When the input or update of the data has been carried out with respect to the data head or degree through the input unit 22 on the client 2 side, the user input outputer 23 transmits the inputted or updated data to the server 1 through the communication controller 24. The inputted or updated data is received by the server 1 and then is delivered to the status watcher 3 (Step 34). After having received the inputted or updated data, the status watcher 3 compares the processing due date 132 of the entry the notice board number of which matches the notice board number of interest and the status 131 of which matches the current process name with the current date by referring to the status change limit rule 12. On the basis of the comparison result, the status watcher 3 judges whether or not the processing due date is passed (Step 35). When the current data passed the processing due date, the message that the data can not be inputted is transmitted to the associated client 2 on the side from which the data is to be inputted, and then the processing is completed (Step 45). Incidentally, in Step 35, in the case as well where the data input is requested from the client 2 with respect to any task process before the current task process, the processing due date is regarded as being passed and the processing proceeds to the processing in Step 45. The data input request after the processing due date has been passed, and the data update with respect to the preceding process after the status change are prohibited except the case where the special permission is given. Incidentally, at the time when it is detected that the current task process passed the processing due date 132, the message may be transmitted to the manager or the like in order to report this fact thereto.

On the other hand, when it is confirmed as the result of the judgement in Step 35 that the current date does not pass the processing due date yet, the status watcher 3 updates the contents of the notice board business system database 11 on the basis of the inputted data (Step 36). Next, the status watcher 3 updates the date of the entry the notice board number of which matches the notice board number of interest and the status 121 of which matches the current process name on the basis of the newest data (Step 37). Then, the confirmation processing for the advanced input of the data from the subsequent task process which will be described later is executed (Step 38). Thereafter, the status watcher 3 judges whether or not the status change occurs by referring to the status change rule 12. In this case, when with respect to the entry the status 121 of which matches the current task process name, the data is inputted to all the data heads except of the data head in which "undecided" is set and also all the degrees 122 thereof are "decided", the status watcher 3 judges that the change from the current task process to the next task process occurs (Step 39).

When it is judged in Step 39 that the status change occurs, the status watcher 3 updates the contents of the entry the notice board number of which matches the notice board number of interest in the status change limit rule 13 and the status 131 of which matches the current process name on the basis of the newest data. In addition, the status 112 of the notice board business system database 11 is updated to the next process name (Step 40). The next process name is registered in the status 121 of the record next to the current task process in the status change rule 12. Subsequently, by referring to both the message file 14 and the destination file 15, the message that the data input in the preceding process has been completed is transmitted to the related section of the next process, and then the processing is completed (Step 41). In this connection, the message thus transmitted is the message corresponding to the entry the notice board number of which matches the notice board number of interest in the message file 14 and the status 141 of which is the next process name. In addition, the destination of the message is the destination section in which the status 151 in the destination file 15 is the next process name, the person in charge of the task process, or the like. Incidentally, the status watcher 3 extracts the necessary data, such as the notice board number, and the name and the data of the data head in which the data input is already carried out, together with the message, from the notice board business system database 11 in order to transmit the data thus extracted together with the message to the related section. The related section which has received the message can open the notice board through the associated client 2 and the server 1.

When it is judged in Step 39 that the status change does not occur, the status watcher 3 refers to the status change limit rule 13 to update the data of the entry, in which the notice board numbers match each other, and the status 131 matches the current process name, on the basis of the newest data (Step 42). Next, both the processing due date 132 and the warning day 133 of the entry of interest are referred to judge whether or not the current date has reached the warning day which is already set to the warning day 133 (Step 43). If the due date is not drawing near, then the processing is completed. On the other hand, if the due date is drawing near, then both the message file 14 and the destination file 15 are referred to transmit the message that the due date is drawing near to the related section in charge of the current task process, and then the processing is completed (Step 44). In this connection, the message thus transmitted is the message corresponding to the entry in which the notice board number of interest matches the notice board number in the message file 14, and the status 141 is the current process name. The destination of the message is determined on the basis of the destination section of the entry in which the status 151 of the destination file 15 is the current process name, the name of the person in charge of the task process, and the like. The status watcher 3 extracts the necessary data, such as the notice board number, the name and the data of the data head in which the data input is already carried out, and the name of the data head in which the data is not inputted yet, together with the message, from the notice board business system database 11 in order to transmit the data thus extracted together with the message to the related section.

Figure 10:
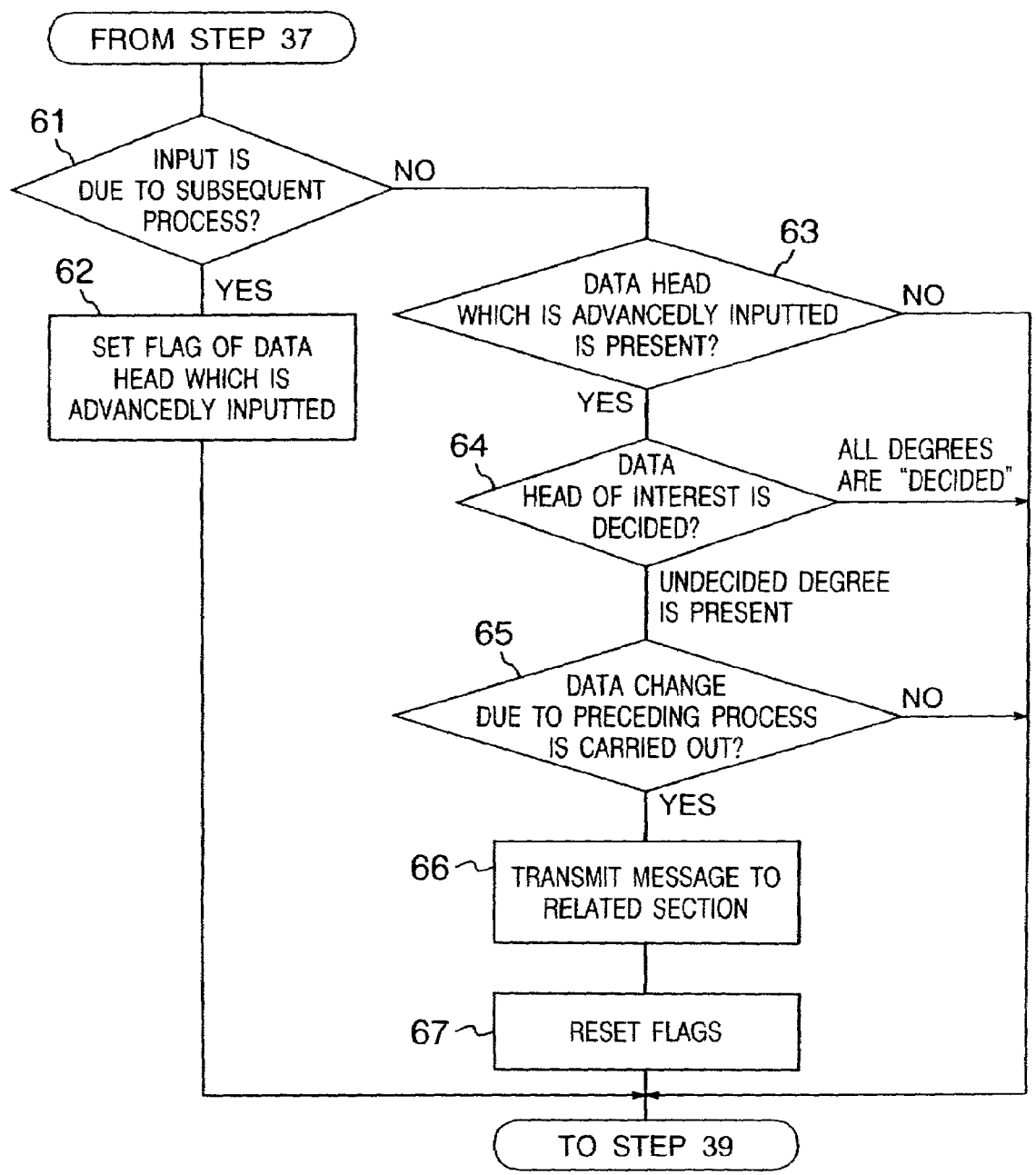
FIG. 10 is a flow chart showing a processing flow with respect to an advanced input in the subsequent task process.

FIG. 10 is a flow chart showing a flow of the processing of confirming the advanced input of the data from the subsequent task process which processing is executed in Step 38 of FIG. 9. When the control exits from Step 37 of FIG. 9, the status watcher 3 judges whether or not the data input is due to the subsequent task process (Step 61). Then, whether or not the data input is due to the subsequent task process is determined by comparing the name of the process in which the data input is required with the name of the current task process in the status 112 of the notice board business system database 11. The name of the task process after the current task process is registered in the status 121 of the status change rule 12 and hence can be confirmed. If the data input is due to the subsequent task process, then the flags 115 and 123 of the notice board business system database 11 and the status change rule 12 corresponding to the data head to which the data is advancedly inputted are set and then the processing proceeds to the processing in Step 39 (Step 62). On the other hand, if it is judged in Step 61 that the data input is not due to the subsequent task process, then it is judged whether or not there is the data head to which the data is advancedly inputted. If the data head in which the flag 115 is set out of the data heads of the current task process is present in the notice board business system database 11, then the data head of interest is the data head to which the data is advancedly inputted (Step 64). If there is no data head to which the data is advancedly inputted, then the processing proceeds directly to Step 39. If the data head to which the data is advancedly inputted is present in Step 64, then the degree of the data head of interest is judged (Step 65). If all the degrees 114 corresponding to the data heads to which the data is advancedly inputted become "decided", then the processing proceeds to Step 39. If the degree 114 of any one of the data heads to which the data is advancedly inputted is "undecided", then it is judged whether or not the data change due to the preceding task process is carried out. When the task process in which the data input is requested is the current task process, and also the data input or data update is carried out with respect to any one of the data heads relating to the business, the data change of interest corresponds to the data change due to the preceding task process (Step 66). When the data change due to the preceding task process is carried out, both the message file 14 and the destination file 15 are referred to transmit the message that the data change due to the preceding task process is carried out to the related section. The message thus transmitted is the message corresponding to the entry in which the notice board number of interest matches the notice board number in the message file 14, and also the status 141 is posterior to the name of the current task process. In addition, the destination of the message is the destination section of the entry in which the status 151 of the destination file 15 is posterior to the name of the current task process, the person in charge of the task process, or the like. Incidentally, the status watcher 3 transmits the notice board number, the name and data of the data head in which the data input/update due to the preceding process is carried out, and the like together with the message to the related section (Step 67). Finally, all the flags 115 and 123 of the notice board business system database 11 and the status change rule 12 are reset, and then the processing proceeds to Step 39 (Step 69). When it is judged in Step 65 that the data change due to the preceding process is not carried out, the processing proceeds directly to Step 39.

According to the above-mentioned embodiment, the person in charge of the task process posterior to the current task process stored in the status of the notice board business system database 11 can input or update the data advancedly. However, the limitation may be provided in such a way that when the current task process reaches the certain specific task process, the operation of referring to the notice board or carrying out the advanced input in the subsequent task process is not permitted unless the certain specific task process is completed.

In addition, according to the above-mentioned embodiment, even when the processing due date 132 which is set in the current task process does not expire, if the data input of the data head required for the task process of interest is completed and also the degree 115 of the inputted data is "decided", then the task process changes automatically from the current task process to the next task process. Therefore, the work flow can be dynamically formed. Besides, since the hysteresis of the past data input and update are left in the status change rule 12, the situation of the past data input/update can be traced if necessary. However, even in this case, if there is the person in charge of the task process who does not look at the notice board, then the task flow will be stagnant. Then, in the present embodiment, when the processing due date is drawing near, the warning message is sent to the person in charge of the task process in the related section, whereby it is possible to promote the data input which is delayed. In addition, with respect to the data head to which the person in charge of the subsequent task process can input the data while maintaining the concept of the current task process, the advanced input is made possible therefor to enhance the task efficiency. But, there is the case where the data is changed later by the person in charge of the preceding task process (the current task process) and hence the data input made by the subsequent task process, in particular, the undecided data input needs to be seen again. In the present embodiment, the message is transmitted in the case where when the data is changed by the person in charge of the preceding task process, the undecided data is advancedly inputted by the person in charge of the subsequent task process. Therefore, even if the data is advancedly inputted by the person in charge of the subsequent task process, the confusion does not occur at all.

Second Embodiment

According to the first embodiment, if one person in charge of the task process carries out the input through the associated client 2 so as for the data heads in the notice board business system database 11 to be set to "decided", then the degree 122 corresponding to these data heads are set to "decided", and hence the data is decided. This method is sufficient for the data head in which the data may be decided by the decision making by one person in charge of the task process. However, there are some data heads in which the persons in charge of the two or more related sections make together the decision making, or only when the sanction of the manager is obtained after the decision making by the person in charge of the task process, i.e., as the result of any conference, the data should be decided. In a second embodiment, the data head which requires such conference is regarded as the decided data only when users in charge of the related sections make together the decision making, and also for the purpose of grasping the situation by the user, the situation of the conference can be reported to the user at all times. In addition, in the first embodiment, with respect to a certain data head, it is reported to the user in charge of the preceding task process that the user in charge of the subsequent task process has carried out the advanced input. However, there is not provided the means for being aware of whether or not the "undecided" data is referred by any other user to become the basic data for use in the task. In the second embodiment, the user who has carried out the data input can be aware of that other users advance their tasks on the basis of the "undecided" data, i.e., other users get the "undecided" data, and also the user can grasp the situation resulting from such advanced getting.

FIG. 11 is a block diagram showing a configuration of a business processing system in the second embodiment according to the present invention. In FIG. 11, the portions which are denoted by the same reference numerals to those of FIG. 2 have the same functions and constructions as the corresponding portions of FIG. 2. While a notice board business system database 18 is, similarly to the notice board business system database 11, the database which acts as the notice board for the associated client 2, its data form is different from that of the first embodiment. While a status change rule 20 is also functionally the same as that of the first embodiment, its form is different from that of the first embodiment. A point of difference of the status change rule 10 from the status change rule 12 of the first embodiment is common with the difference of the notice board business system database 18 which will be described later from the notice board business system database 11, and hence the detailed description thereof will be omitted here for the sake of simplicity. An access competency file 19 is a file wherein with respect to the data and the various kinds of flags of the data heads in the notice board business system database 18, pro and con of reference or writing are set every user in charge of the task process. The access competency file 19 is, similarly to other files, stored in the memory connected to the server 1. A status watcher 4 of the server 1 has, in addition to the function of the status watcher 3 in the first embodiment, the function of carrying out the judgement of the situation of decision of the data of the data heads, the judgement of the degree of the data, the judgement of the advanced get notice of the data and the setting of the related flag. The client 2 is configured so as to include the similar function to that of the client 2 of the first embodiment. The form of the data which is transmitted between the server 1 and the associated client 2 is different from that of the first embodiment, and hence the processing of the user input outputer 23 is slightly different from that of the first embodiment. However, since the main function of the user input outputer 23 of the second embodiment is not greatly different from that of the user input outputer 23 of the first embodiment, the user input outputer of the second embodiment is denoted by the same reference numeral as that in the first embodiment. Incidentally, in the following description, in the part in which the description is given by giving the concrete example, it is assumed that the business which is exemplified in FIG. 1 is carried out by the person in charge of the business, the section chief of the business and the person in charge of a storehouse each as a user.

FIG. 12 is a schematic view showing the data form of the notice board business system database 18. Incidentally, in the following description, there is assumed the case where there are, as the data heads, "customer's name", "product name", "amount", "delivery price", and "date of delivery". The attribute information, of the notice board business system database 18 of the present embodiment, which is set in correspondence to the data heads is different from that in the first embodiment. In the present embodiment, as the attribute information for representing the status of the data which is set in the data heads, there is provided a conference flag 181, a decision flag 182, a get notice flag 183, a decision flag 184 of conference request, a decision flag 185 of conference reply, a holding conference flag 186, a get notice flag 187 of conference request, a get notice flag 188 of conference reply, and a get notice flag 189 of other section. The conference flag 181 is provided in correspondence to all the data heads and is the flag for representing whether or not with respect to the contents of the corresponding data head, the conference by a plurality of persons in charge of the processing is required in order to decide the data which is set in the data head of interest. If the value of the conference flag 181 is "0", then no conference is required. On the other hand, if the value of the conference flag 181 is "1", then the conference is required. With respect to the data head in which "0" is set to the value of the conference flag 181, the decision flag 182 and the get notice flag 183 are contained therein as the attribute information. The decision flag 182 is the flag corresponding to the degree 122 in the first embodiment and also is the flag for representing whether or not the decision making is made with respect to the contents of the corresponding data head by the person in charge of the input. In this case, it is meant that when the status of the decision flag becomes "1", the data which is set in the data head of interest is the decided data. The get notice flag 183 is the flag for representing that with respect to the undecided data of the data head which requires no conference, any other section gets advancedly the data. When the data is got in the corresponding data head by any other section, "1" is set to the get notice flag 183. For example, in FIG. 12, paying attention to the data head of "customer's name", "0" is set to the conference flag 181 and hence it is understood that with respect to this data head, no conference is required. Then, "1" is set to the decision flag 182, and hence it is shown that the data of "company A" which is set in this data head is decided. In addition, "1" is also set to the get notice flag 183, and hence it is understood that the data is being got to other section now.

On the other hand, when the value of the conference flag 181 is "1", the decision flag 184 of conference request, the decision flag 185 of conference reply, the holding conference flag 186, the get notice flag 187 of conference request, the get notice flag 188 of conference reply and the get notice flag 189 of other section are contained in the attribute information. The decision flag 184 of conference request represents the status of the decision making by the person in charge of the processing who requests the conference. The decision flag 185 of conference reply represents the status of the decision making by the person in charge of the processing who replys the request of the conference. Whether the data inputted to the data heads is the decided data or the undecided data is discriminated on the basis of these two flags. When both the values of the decision flag 184 of request and the decision flag 185 of reply become "1", the data of the data head of interest is decided, while is undecided in any case other than that case. Incidentally, in the case where the data which has been decided by the person in charge of the request is rewritten by the person in charge of the reply, or the data which has been decided in the reply side is rewritten by the request side, the value of the decision flag 184 of conference request or the value of the decision flag 185 of conference reply is respectively reset to "0". The value of holding conference flag 186 is set to "1" when the conference is carried out. In the case where for the data for which the conference is requested on the basis of the decision making by the person who requests the conference, its value is corrected by the person who replys the conference to carry out the decision, the conference is not established between the request side and the reply side, and hence the data is not decided. In this case, however, the conference is regarded as being established therebetween and then the value of the holding conference flag 186 is set to "1". In the case where the data which is set to the data head is undecided, "1" is set to the get notice flag 187 of request, the get notice flag 188 of reply and the get notice flag 189 of other section when that data is got to the conference request side, the conference reply side and any other section, respectively. In the present embodiment, it is assumed that in the case where the data which requires the conference is intended to be got to any other section which does not join in the conference, the value of the holding reference flag 186 needs to become "1". In FIG. 12, for example, paying attention to the data head of "delivery price", "1" is set to the conference flag 181, and hence it is shown that the conference is required for that data head. Since with respect to the decision status of the data, the value of the decision flag 184 of request is "1", while the value of the decision flag 185 of reply is "0", the decision making by the conference request side is carried out, while the decision making by the conference reply side is not carried out yet, and hence the undecided status is provided. In addition, since the value of the holding conference flag 186 is "0", it is understood that the conference is not carried out yet, and hence the data of interest can not be got by any other section.

Furthermore, similarly to the first embodiment, the advanced input flag 115 is provided as the attribute information in correspondence to the data heads. Incidentally, as for the structure of the notice board business system database 18, the data structure may be adopted in which the data of the data heads and the corresponding flags are separately stored in the memory, and also the address pointer links the data of the data heads and the corresponding flags.

FIG. 13 is a schematic view showing an example of the data form of the access competency file 19. The access competency file 19 is the file for defining the competency with respect to the accessable data and its flag every user. In FIG. 13, out of the data heads shown in FIG. 12, the definition with respect to "delivery price", "appointed delivery day" and the attribute information corresponding to these data heads is omitted with its illustration. In the figure, the data or flag in which "-" is set in the field of reference represents that reference is prohibited. The data or flag in which "-" is set in the field of writing represents that writing or update can not be carried out. "Approval" which is set in the field of writing represents that writing or update is permitted, and "approval" which is set in the field of reference represents that it is permitted to make reference to the data. For example, paying attention to the data head of "product name", the person in charge of the business can carry out reference as well as writing with respect to the data itself of the product name. Both the section chief of the business and the person in charge of a storehouse can refer to the data of the data head of "product name", but can not carry out writing. With respect to the decision flag 182, reference as well as writing are permitted for the person in charge of the business, while only reference is permitted for both the section chief of the business and the person in charge of a storehouse, and also writing is not permitted therefor. This reason is that the product name is the data head which requires no conference, and the data which has been decided at discretion of the person in charge of the business becomes decided. In other words, this means that both the section chief of the business and the person in charge of a storehouse may confirm whether or not the decision is made, i.e., whether or not the decision is made on the basis of the decision flag 182 in some cases, but they can not carry out the operation of deciding the data. Next, with respect to the get notice flag 183, the person in charge of the business can not carry out writing, but can carry out reference. On the other hand, both the section chief of the business and the person in charge of a storehouse can carry out writing, but can not carry out reference with respect to the get notice flag. This means that with respect to the data head of the product name, both the section chief of the business and the person in charge of a storehouse can get the data irrespective of the decision made by the person in charge in the business. The indication for representing that both the section chief of the business and the person in charge of a storehouse have got advancedly the data is displayed on the display device 21 on the side of the person in charge of the business. Since the person in charge of the business is on the side from which the data is got, he/her can not carry out writing of data to the get notice flag 183 showing that the data has been "got". However, since the information for representing that the data has been "got" is displayed on the display screen, reference becomes "approval". On the other hand, both the section chief of the business and the person in charge of a storehouse take up their posts where the data can be got. Therefore, writing to the get notice flag 183 is set to "approval". The display representing that the data has been got is not required for both the section chief of the business and the person in charge of a storehouse, and hence "-" is set in the field of reference. In addition, in the present embodiment, a user who can carry out writing of data to the decision flag 184 of request is on the conference request side, and a user who can carry out writing of data to the decision flag 185 of reply is on the conference reply side. For example, with respect to the data head of "amount", the person in charge of the business is on the conference request side, while the person in charge of a storehouse is on the conference reply side. Incidentally, both the status 121 and the advanced input flag 123 can be referred by any side user, but writing of data thereto can not be carried out. In addition, the conference flag 181 is the information which is required for executing the program by the status watcher 4, and "-" is set in all the fields of the conference flag 181 since a user does not directly carry out writing or reference.

FIG. 14a is a schematic view showing the form of the notice board data which is transmitted from the server 1 to the associated client 2. To the data of the data heads are added the decision flag 161, the degree flag 162 and the advanced get notice flag 163. The decision flag 161 is the flag for representing the situation of the decision flag of the corresponding data head, and the value of the decision flag 182 is stored with respect to the data head which requires no reference. On the other hand, with respect to the data head which requires the conference, the value of the decision flag 184 of request or the decision flag 185 of reply is stored depending on whether the data transmitted user is on the conference request side or the conference reply side. The decision flag 162 is the flag for representing whether or not the corresponding data head is decided. The advanced get notice flag 163 is the flag for representing whether or not the corresponding data head is advancedly got.

FIG. 14b is a schematic view showing the form of the data which is transmitted from the associated client 2 to the server 1. The data to be transmitted includes the data which is sent from the server 1 every data head or is inputted/updated in the client 2, and the decision flag 161 and the get notice flag 164 which belong thereto. The decision flag 161 has the same meaning as that of the decision flag in the data which is sent from the server. An intention of decision of a user for the corresponding data head reflects in the decision flag 161 in the data which is sent from the client 2 to the server 1. For example, if for the undecided data which has been sent from the server with "0" being set to the decision flag 161, the operation for deciding that data is carried out by a user, then that data is sent to the server 1 with "1" being set to the decision flag 161. The get notice flag 164 is used to inform the server 1 of that a user has got the corresponding data. A user can carry out the get notice operation with respect to the data of the desired data head. Then, when a user carries out the operation of getting the data, then "1" is set to the get notice flag 164 corresponding to that data head.

Figure 15:
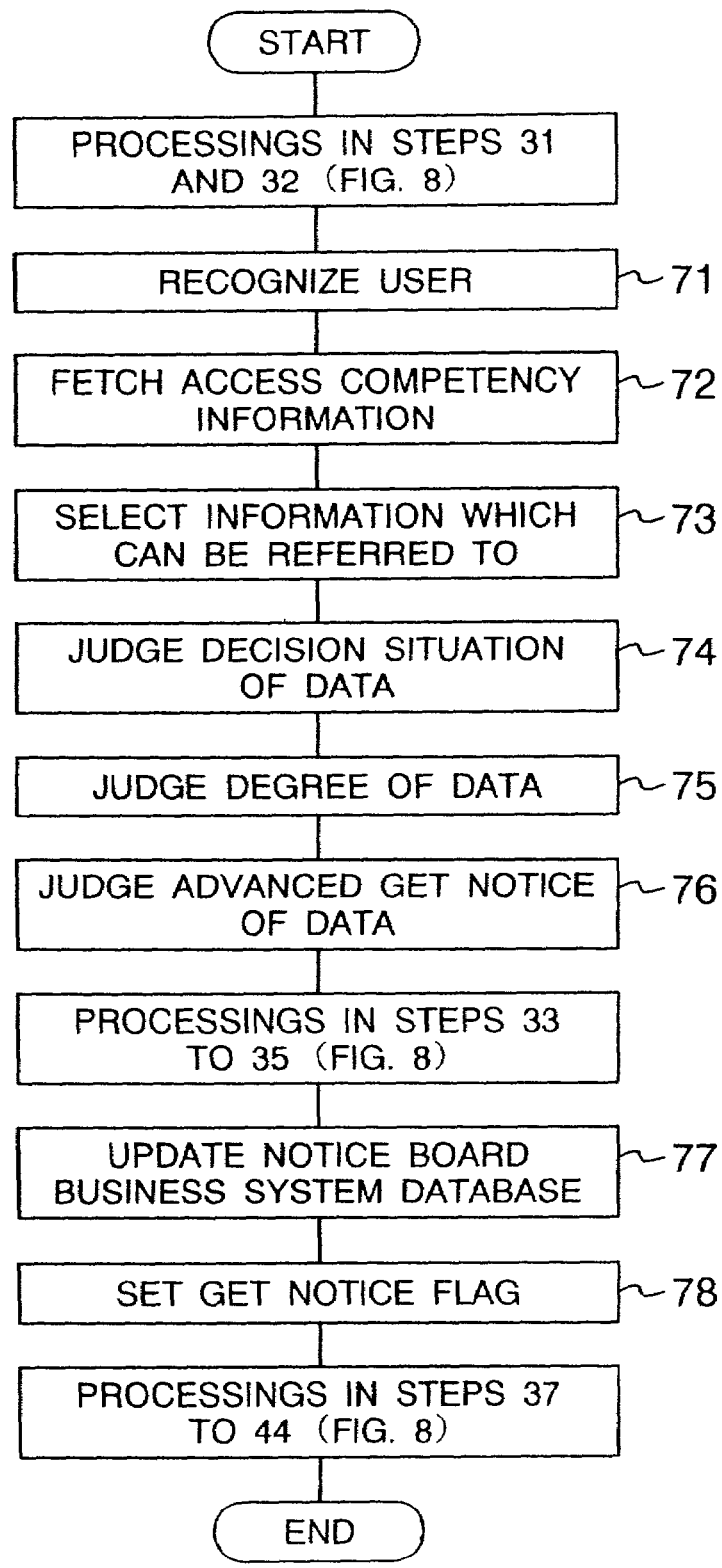
FIG. 15 is a flow chart showing a processing flow in a status watcher.

FIG. 15 is a flow chart showing a flow of the processing in the status watcher 4. In the processing in the status watcher 4 in the present embodiment, as shown in FIG. 15, the processings from Step 71 to Step 76 are additionally provided between the processings of Step 32 and Step 33 in the first embodiment shown in FIG. 9, and also the processing of Step 36 is replaced with the processings of Step 77 and Step 78. Now, the processings which are newly executed in the present embodiment will hereinbelow be described mainly, and also the description of the processings overlapping with those in the first embodiment is omitted here for the sake of simplicity. After the status watcher 4 fetches, in response to the request issued from the client 2, the specified notice board from the notice board business system database (Steps 31 and 32), it recognizes the user who has made the request on the basis of the identifier (Step 71). Then, the status watcher 4 retrieves the access competency file 19 in accordance with the recognition result to fetch the access competency information with respect to the data and the flags of the user of interest (Step 72). Next, the status watcher 4 selects the data, to which the user of interest can make reference, out of the notice board which has been fetched in Step 32, i.e., the data which can be displayed on the basis of the access competency information thus fetched (Step 73).

Next, the status watcher 4 carries out the judgement of the decided situation by the decision flag out of the selected data and flags, and obtains the value of the decision flag 161 which is added to the data heads which are to be transmitted to the client 2. For example, in the case where the data head which has been selected in Step 73 is the data head which requires no conference, if the value of the decision flag 182 is "1", then the status watcher 4 sets the value of the decision flag 161 belonging to the data head which is to be transmitted to "1". On the other hand, if the value of the decision flag 182 is "0", then the value of the decision flag 161 is set to "0". In addition, in the case where the data head which has been selected in Step 73 is the data head which requires the conference, if the user of interest is on the conference request side and the value of the decision flag 184 of request is "1", then the status watcher 4 sets "1" to the decision flag 161. If the value of the decision flag 184 of request is "0", then "0" is set to the decision flag 161. Likewise, if the user of interest is on the conference reply side and also the value of the decision flag 185 of reply is "1", then the status watcher 4 sets the value of the decision flag 161 to "1", while if the value of the decision flag 185 of reply is "0", then the status watcher 4 sets the value of the decision flag 161 to "0". In addition, in the case where the user of interest is on neither the conference request side nor the conference reply side, if both the values of decision flag 184 of request and the decision flag 185 of reply are "1", then the status watcher 4 sets "1" to the decision flag 161, and in the case other than that case, sets "0" to the decision flag 161. As a result, even in the case of the data head requiring the conference, when viewed from the user who is unrelated to the conference, this data head seems as if it is the data head requiring no conference. The status watcher 4 executes the above-mentioned processings with respect to all the data heads which were selected (Step 74).

After the status watcher 4 has decided the value of the decision flag added to each of the data heads which were selected, it judges the degree of the data on the basis of both the values of the conference flag 181 and the decision flag thus decided. With respect to the decided data, the value of the degree flag 162 belonging to the data head which is to be transmitted is set to "1", while with respect to the undecided data, the value of that decision flag 162 is set to "0". The status watcher 4 executes the processing described above with respect to all the selected data heads. The details of the processing in here will be described later (Step 75).

Next, the status watcher 4 refers to the get notice flag 183, the get notice flag 187 of request, the get notice flag 188 of reply and the get notice flag 189 of other section to judge whether or not the data is advancedly got. With respect to the data which is advancedly got, the value of the advanced get notice flag 163 belonging to the data head which is to be transmitted is set to "1". The status watcher 4 executes that processing with respect to all the selected data heads. The details of that processing will be described later (Step 76).

The status watcher 4 makes collectively the data of the data head selected in Step 73, and the decision flag 161, the degree flag 162 and the advanced get notice flag 163 which have been decided in Steps 74 to 76 with respect to the selected data head the transmission data, and then transmits the transmission data to the associated client 2 through the communication controller 17. In the client 2, the data which has been sent from the server 1 is displayed on the display device 21 so that the business processing by the user is executed. When input or update for the data head, the decision flag or the get notice flag has been carried out as the result of executing the business processing in the client 2, the inputted or updated data or flags is arranged into the data format shown in FIG. 14*b* as already described above to be sent to the server 1. Then, the status watcher 4 receives the input data and then checks whether or not it is before the processing due date (Steps 33 to 35).

If it is confirmed that it is before the processing due date, then the status watcher 4 updates the contents of the notice board business system database 18 in accordance with the data which has been sent from the client 2 and the decision flag 161. The status watcher 4 is permitted to carry out update by the user of interest on the basis of the access competency file 19, and also updates the data heads to which the data can be inputted and the flags. Now, the processing of updating the flags on the basis of the decision flag 161 in the received data is executed as follows. With respect to the data head in which the value of the conference flag 181 is "0", the value of the decision flag 161 which has been received is set in the decision flag 182. That is, if there is the decision making by the user, then the value of the decision flag 182 is set to "1". If with respect to the data head in which the value of the reference flag 181 is "1", the user of interest is on the conference request side, the value of the original decision flag 184 of request is "0", and the value of the decision flag 161 is "1", then the status watcher 4 sets the value of the decision flag 184 of request is "1". When the user of interest is on the conference reply side, the value of the original decision flag 185 of reply is "0" and the value of the decision flag 161 is "1", likewise, the status watcher 4 sets the value of the decision flag 185 of reply to "1". When both the values of the decision flag 184 of request and the decision flag 185 of reply become "1" by carrying out that operation, the value of the holding conference flag 186 is set to "1". When the data of the data head in which the value of the decision flag 184 of request is "1" is updated by the reply side, the value of the decision flag 184 of request is changed to "0" and also "1" is set to the holding conference flag 186 irrespective of the contents of the decision flag 185 of reply. When the data of the data head in which the value of the decision flag 185 of reply is "1" is updated by the request side, the value of the decision flag 185 of reply is changed to "0" and also the value of the holding conference flag 186 is set to "1" irrespective of the contents of the decision flag 184 of request (Step 77).

Next, the status watcher 4 executes the processing of setting the get notice flag. With respect to the data head in which "0" is set to the conference flag 181 and also the value of the decision flag 182 is "0", the value of the get notice flag 164 which has been received is set in the get notice flag 183. That is, if the advanced get notice is requested by a user, then the status watcher 4 set "1" to the get notice flag 183. With respect to the data head in which the value of the conference flag 181 is "1", when the value of the received get notice flag 164 is "1", the setting of the get notice flag 187 of request, the get notice flag 188 of reply and the get notice flag 189 of other section is controlled in accordance with the status of the holding conference flag 186, the decision flag 184 of request and the decision flag 185 of reply by the user who is on one of the conference request side, the conference reply side and any other section (Step 78).

After having updated the notice board business system database 18 in a manner as described above, the status watcher 4 executes the processings in Steps 37 to 44 similarly to the first embodiment.

Figure 16:
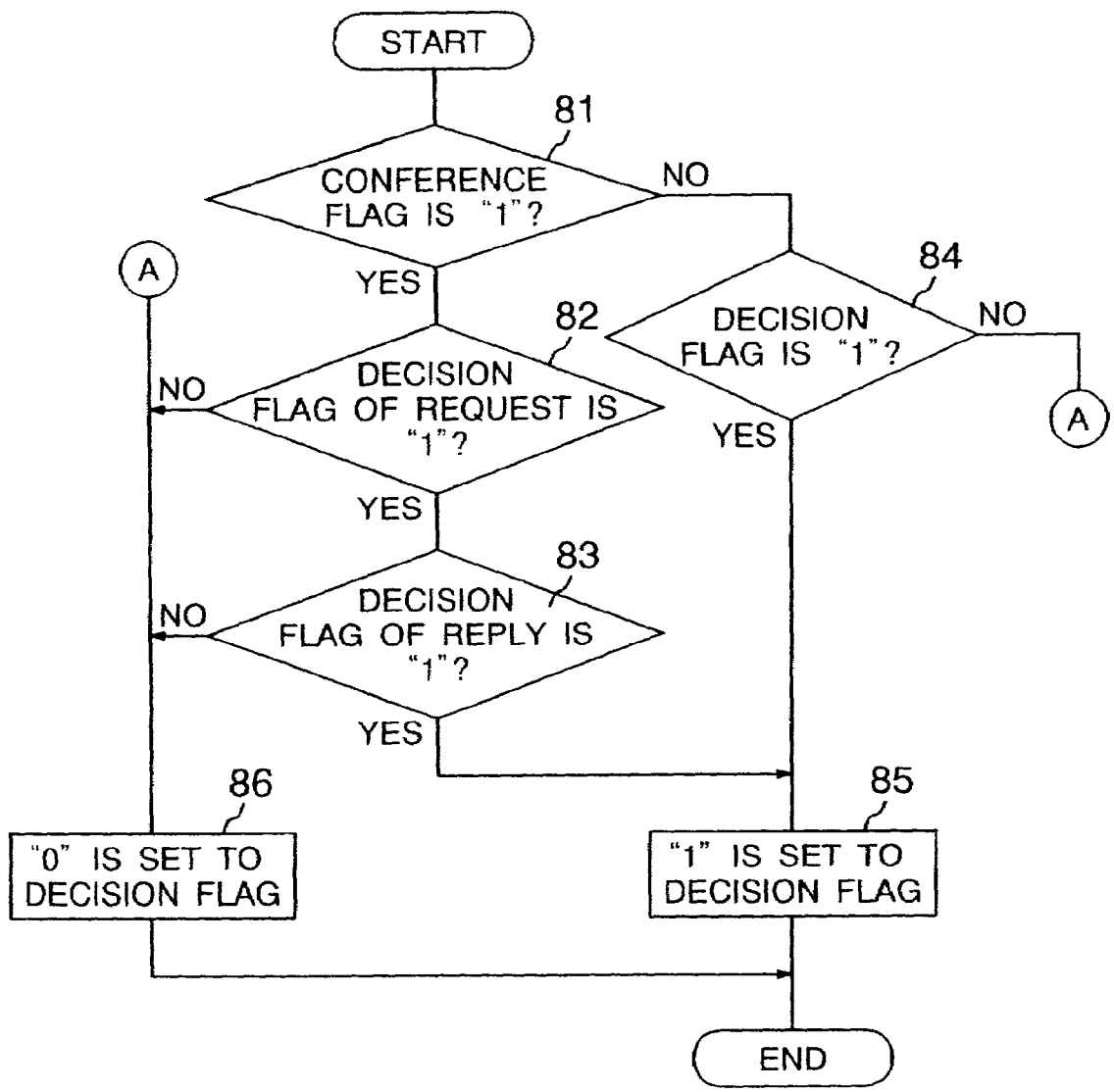
FIG. 16 is a flow chart showing a processing flow of the processing of judging degree of data.

FIG. 16 is a detailed flow chart showing the processing of judging the degree of the data which processing is executed in Step 75. The status watcher 4 judges with respect to the data selected in Step 73 and the flags whether or not "1" is set to the conference flag 181 (Step 81). When the value of the conference flag 181 is "0", the status watcher 4 carries out the judgement of the value of the decision flag 182 with respect to the data head of interest (Step 84). If the value of the decision flag 182 is "1", then the value of the degree flag 162 belonging to the data head which is to be transmitted to the client 2 side is set to "1" (Step 85). When the value of the decision flag 182 is "0", the value of the degree flag 162 belonging to the data head which is to be transmitted is set to "0" (Step 86). On the other hand, when the value of the conference flag 181 is "1" in Step 81, the status watcher 4 successively judges whether or not the conference request side has determined the data on the basis of the decision flag 184 of request (Step 82). When the value of the decision flag 184 of request is "0", the status watcher 4 sets the value of the degree flag 162 belonging to the data head which is to be transmitted to "0" (Step 86). When the value of the decision flag 184 of request is "1", the status watcher 4 further judges on the basis of the decision flag of reply whether or not the conference reply side has determined the data (Step 83). When the value of the decision flag 185 of reply is "0", the status watcher 4 sets the value of the degree flag 162 belonging to the data head which is to be transmitted to "0" (Step 86). When the value of the decision flag 185 of reply is "1", the value of the degree flag 162 belonging to the data head which is to be transmitted is set to "1" (Step 85).

As described above, for the data head in which "1" is set to the degree flag 162, its data has been decided. Such data corresponds to the decided data in the first embodiment and hence hereafter is similarly referred to as the decided data in the present embodiment as well. In addition, the data in a state in which the value of the decision flag becomes "0" on the basis of the above-mentioned processing is referred to as the undecided data.

Figure 17:
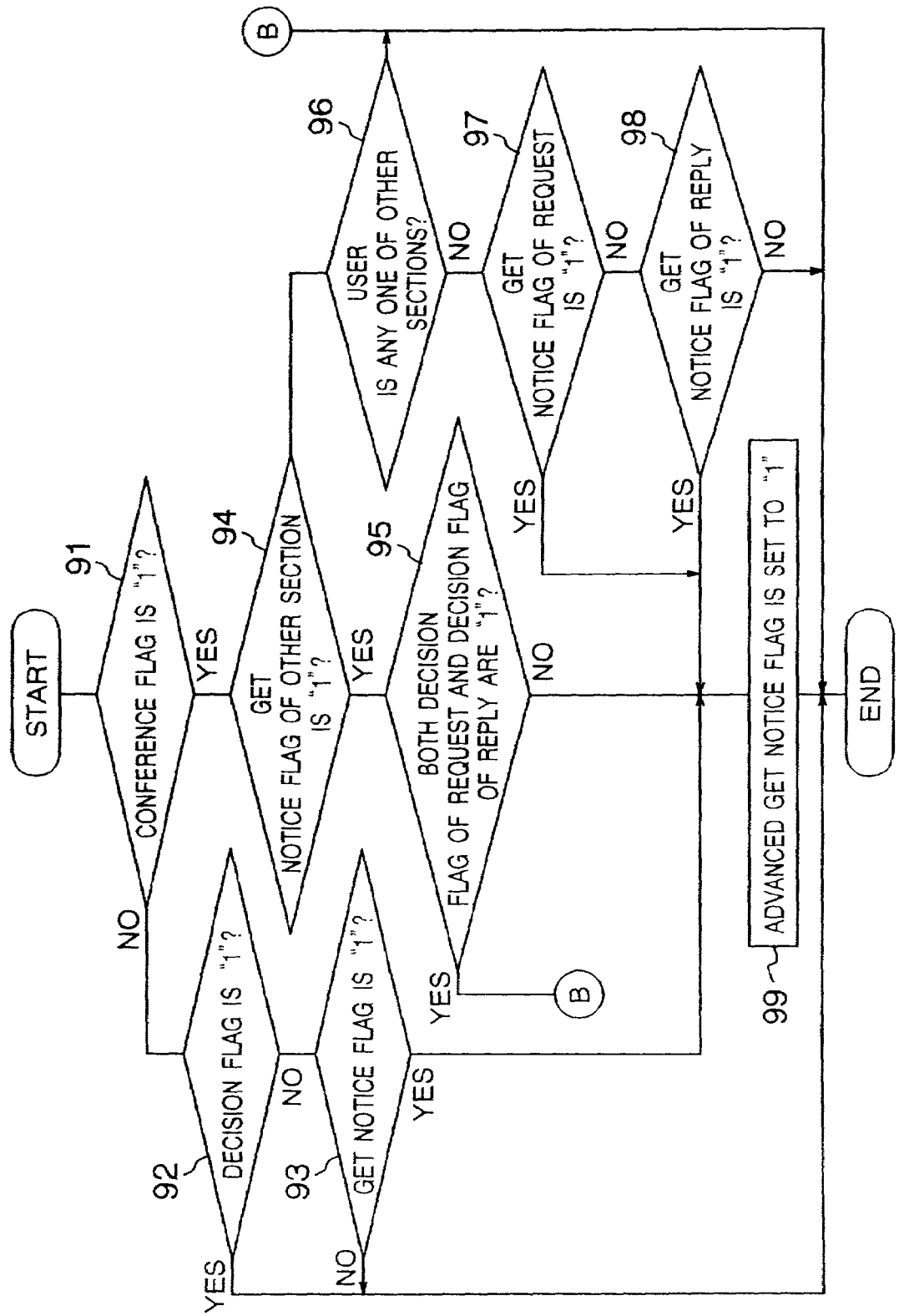
FIG. 17 is a flow chart showing a processing flow of the processing of judging whether or not data is advancedly got.

FIG. 17 is a detailed flow chart showing the processing of judging the advanced get notice of the data which processing is executed in Step 76. The status watcher 4 judges whether or not with the selected data and the flags, the value of the conference flag 181 is "1" (Step 91). When the value of the conference flag 181 is "0", the status watcher 4 carries out the judgement of the decision flag 182 of the data head of interest (Step 92). When the value of the decision flag 182 is "1", the processing proceeds directly to the processing in Step 33 since no advanced get notice occurs. On the other hand, when the value of the decision flag 182 is "0", the status watcher 4 further carries out the judgement of the get notice flag 183 (Step 93). If the value of the get notice flag 183 is "1", after the status watcher 4 has set the value of the advanced get notice flag 163 belonging to the data head which is to be transmitted to the associated client 2 to "1", the processing proceeds to the processing in Step 33 (Step 99). If the value of the get notice flag 183 is "0", then it is judged that the advanced get notice is not carried out, and then the processing proceeds to the processing in Step 33.

When the value of the conference flag 181 is "1" in Step 91, the status watcher 4 judges on the basis of the get notice flag 189 of other section whether or not the data is got by any one of other sections (Step 94). When the value of the get notice flag 189 of other section is "1", the status watcher 4 judges on the basis of the decision flag 184 of request and the decision flag 185 of reply whether or not the conference reply side has got the data from the conference request side and also whether or not the conference request side has got the data from the conference reply side (Step 95). When both the values of the decision flag 184 of request and the decision flag 185 of reply are "1", the status watcher 4 proceeds directly to the processing in Step 33 since no advanced get notice occurs. On the other hand, when both the values of the decision flag 184 of request and the decision flag 185 of reply are not "1", i.e., when the value of at least one of the decision flag 184 of request and the decision flag 185 of reply is set to "1", the status watcher 4 sets the value of the advanced get notice flag 163 belonging to the data head which is to be transmitted to "1" (Step 99). In such a way, when the value of the get notice flag 189 of other section is "1", if "1" is not set to both the decision flag 184 of request and the decision flag 185 of reply, then the data of interest will be advancedly got by any one of other sections.

When the value of the get notice flag 189 of other section is "0" in Step 94, the status watcher 4 judges whether or not the user is any one of other sections (Step 96). When the user is any one of other section, the status watcher 4 proceeds directly to the processing in Step 33 since no advanced get notice occurs. On the other hand, when the user is not any one of other sections, but is on either the conference request side or the conference reply side, the status watcher 4 judges on the basis of the get notice flag 187 of request whether or not the conference request side has got the data (Step 97). When the value of the get notice flag 187 of request is "1", "1" is set to the advanced get notice flag 163 belonging to the data head which is to be transmitted (Step 99). On the other hand, when the value of the get notice flag 187 of request is "0", the status watcher 4 further judges on the basis of the get notice flag 188 of reply whether or not the conference reply side has got the data (Step 98). When the value of the get notice flag 188 of reply is "1", the status watcher 4 sets the value of the advanced get notice flag 163 belonging to the data head which is to be transmitted to "1" (Step 99). On the other hand, when the value of the get notice flag 188 of reply is "0", the status watcher 4 proceeds directly to the processing in Step 33.

FIG. 18 is a flow chart showing a flow of the processing of setting a get notice flag which processing is executed in Step 78. When with respect to the data head in which the value of the conference flag 181 is "1" in the notice board business system database 18, the value of the corresponding get notice flag 164 which has been received from the client 2 is "1", i.e., the operation of getting the data is carried out in the client 2 by a user, the status watcher 4 executes the following processings. Firstly, the status watcher 4 identifies the user in order to judge whether the user is on the conference request side or the conference reply side (Step 101). When it becomes clear as the result of the judgement that the user of interest is on neither the conference request side nor the conference reply side, but is the user of any one of other sections, the status watcher 4 judges whether or not the value of the holding conference flag 186 is "1" (Step 102). In the present embodiment, the processing is executed on the basis of the rule that "the data requiring the conference which is not carried out even one time can not be got by the user in any one of other sections". For this reason, the data of interest can not be advancedly got by the user of any one of other sections unless the conference is carried out and hence the value of the holding conference flag 186 becomes "1". When the value of the holding conference flag 186 is judged not to be "1" in Step 102, since the advanced get notice can not be carried out, the status watcher 4 sends an error message to the client 2 which has carried out the request and then the processing is completed (Step 110). When the value of the holding conference flag is "1", then it is judged whether or not both the values of the decision flag 184 of request and the decision flag 185 of reply are "1". This judgement is carried out in order to distinguish whether or not the data of interest will be advancedly got (Step 103). When both the values of the decision flag 184 of request and the decision flag 185 of reply are "1", the processing in here is completed since no advanced get notice occurs. When both the values of the decision flag 184 of request and the decision flag 185 of reply are not "1", the status watcher 4 sets "1" to the get notice flag 189 of other section, thereby completing the processing (Step 104). When it is judged in Step 101 that the user is on either the conference request side or the conference reply side, then it is judged whether or not the user is on the conference request side (Step 105). When the user is judged to be on the conference request side, it is judged whether or not the value of the decision flag 185 of reply is "1" (Step 106). When the value of the decision flag 185 of reply is "1", i.e., the data is in the decided state, the processing is directly completed since no advanced get notice occurs. On the other hand, when the value of the decision flag 185 of reply is not "1", i.e., the data is in the undecided state, in order to show that the data is got by the conference request side before the decision by the conference reply side has been made, the status watcher 4 sets "1" to the get notice flag 187 of request, thereby completing the processing (Step 107). In addition, when the user is judged to be on the conference reply side in Step 105, the status watcher 4 judges whether or not the value of the decision flag 184 of request is "1" (Step 108). When the value of the decision flag 184 of request is "1", i.e., the data is in the decided state, the processing is directly completed since no advanced get notice occurs. On the other hand, when the value of the decision flag 184 of request is not "1", i.e., the data is in the undecided state, in order to show that the conference reply side gets the data before the decision by the conference request side has been carried out, the status watcher 4 sets "1" to the get notice flag 188 of reply, thereby completing the processing (Step 109).

What style the notice board data is displayed on the display device 21 of the client 2 in accordance with the notice board data sent from the server 1 as the result of the above-mentioned processing will hereinbelow be concretely described by giving several examples.

FIG. 19 is a first display example of the notice board which is displayed on the display device 21 of the client 2, and is a schematic view useful in explaining mainly what style whether or not the decision making is made by the person in charge of the task process or the manager is displayed on the screen. The user input outputer 23 displays the data with respect to the data heads of the notice board which has been sent from the server 1, and also displays the radio buttons, in an on or off style, corresponding to the displayed data in accordance with the decision flag 161 belonging to the data heads. In the figure, the open circle represents the radio button in the off state, while the open circle having therein the black dot represents the radio button in the on state. Each of the radio buttons represents whether or not the data corresponding thereto is decided by the person in charge of the task process or the manager. In the example shown in FIG. 19, all the data of the customer's name and the product name is decided since the radio buttons corresponding to that data are in the on state. On the other hand, the data heads of the amount, the delivery price and the appointed delivery day are not decided yet since the radio buttons corresponding to those data heads are in the off state. Incidentally, the off-display can be changed to the on-display by pressing the desired radio button down by a user, and the result of this change is sent as the decision flag 161 of the corresponding data head to the server 1.

FIG. 20 is a second display example of the notice board which is displayed on the display device 21, and is a schematic view useful in explaining mainly what style with respect to the data to be displayed, decided/undecided of its degree is displayed on the screen. When having received the data of the notice board from the server 1, the user input outputer 23 displays the data in the form of the black face or the light face on the display device 21 in accordance with the value of the degree flag 162 belonging to the associated data head. In this example, the data of both the customer's name and the product name is displayed in the form of the black face. As a result, a user can recognize that the data is decided with respect to both the customer's name and the product name. On the other hand, the data of the amount, the delivery price and the appointed delivery day is displayed in the form of the light face and hence a user can recognize that the data is not decided yet with respect to the amount, the delivery price and the appointed delivery day.

FIG. 21 is a third display example of the notice board which is displayed on the display device 21, and is a schematic view useful in explaining mainly what style the degree of the data is displayed on the screen. In this example, the description is given on the assumption of the displayed picture which is displayed on the display device 21 when a user of the client 2 is the person in charge of the business. Incidentally, it is assumed that with respect to the customer's name and the product name, its data is decided by the decision making by the person in charge of the business, and with respect to the delivery price, its data is decided by the settlement by the section chief of the business for the data which was decided by the person in charge of the business, i.e., by the conference. In addition, it is assumed that both the amount and the appointed delivery day are decided on the basis of the conference made by both the person in charge of the business and the person in charge of a storehouse. In this example, both the customer's name and the product name are displayed in the form of the black face and hence it is understood that the decision making was made for both the customer's name and the product name by the person in charge of the business and also both the customer's name and the product name are decided. In addition, both the delivery price of a television set and the delivery price of a video tape recorder are also displayed in the form of the black face and hence it is understood that the decision making was made by the person in the charge of the business and the settlement was made by the section chief of the business to decide the data. On the other hand, while with respect to the delivery price of an air conditioner, its radio button is in the on state, its data is displayed in the form of the light face. Therefore, it is understood that while the decision making was made by the person in charge of the business, the settlement is not made yet by the section chief of the business and hence the data of interest is the undecided data. Likewise, since with respect to the amounts of products as well, their radio buttons are in the on state and the data is displayed in the form of the light face, it is understood that the decision making was made by the person in charge of the business who operates the client 2, but the settlement is not made yet by the person in charge of a storehouse. Since with respect to the appointed delivery day, the data is set, but the decision making is not made yet by the person in charge of the business, its radio button is in the off state.

FIG. 22 is a fourth display example of the notice board which is displayed on the display device 21, and is a schematic view useful in explaining mainly the displayed picture in which the got data is displayed. In this example, the description is given on the assumption that the decided status of the data is the same as that exemplified in FIG. 21, and under this condition, the data of the data heads of "customer's name", "product name", "amount" and "appointed delivery day" is got by the person in charge of a storehouse. The notice board as shown in FIG. 22 is displayed on the display device 21 of the client 2 which the person in charge of the business operates. In the present embodiment, the undecided data which was advancedly got is displayed with being underlined in order to be able to be distinguished from the decided data which was normally got. In the example shown in the figure, since the data of the data heads of the the customer's name and the product name is the decided data, the data is not underlined at all even if the data was already got by the person in charge of a storehouse. The conference is required for the data of the data head of "amount", and while that data is undecided, the decision making therefor by the person in charge of the business was already made. In addition, since the person in charge of a storehouse is in the conference reply side with respect to the data head of "amount", the get notice of interest is regarded as the normal get notice if the decision making by the person in charge of the business as the conference request side was made, and hence the underline meaning the advanced get notice is not displayed at all. Since the data of "6/10" of the data head of "appointed delivery day" is not decided yet by the person in charge of the business, the underline is displayed therefor in order to represent that the get notice was carried out by the person in charge of a storehouse as the conference replying side.

According to the embodiment described above, the data is decided in the form of the conference reflecting the decision making of the persons in charge of a plurality of task processes, the result of the conference is reported to a user and also a user who carried out the data input is informed of that the undecided data was advancedly got. Therefore, it is possible to progress the task while grasping the situation with respect to the action which any other user has taken. Incidentally, the present embodiment has been described by taking the specific case where the conference reply side corresponds to only one section by an example. However, it should be noted that in even in the case where the conference reply side corresponds to a plurality of sections, the above-mentioned procedure can be realized similarly to that in the above-mentioned embodiment. In this case, in the above-mentioned embodiment, in the processing of carrying out the judgement of the decision flag of reply, the data may be managed as being decided on the conference reply side when the value of the decision flag of reply corresponding to all the conference reply sides is set to "1".

Third Embodiment

In the first and second embodiments, the status of the notice board is changed when the predetermined data head becomes decided. As for the form in which the data is decided to be inputted for the data head, the following form may be considered. The first form is the form wherein there is only one data which may be taken with respect to one data head. In this case, one notice board is constructed by one record. The second form is the form wherein there are two or more data which may be taken with respect to at least one data head. In this case, one notice board is constructed by a plurality of records. The method of storing, when the record constituting the notice board is single, the data in the single notice board is different from the method of storing, when a plurality of records constituting the notice board are provided, the data in the notice board. In the notice board of the single record, the data should be stored in the database in such a way that the task status on the notice board is reflected for the data which is inputted to all the data heads. On the other hand, in the notice board constituted by a plurality of records, even when the data is inputted to only the part of the data heads, the status of the notice board can be changed every record. For example, in the case of the notice board in which the names of a plurality of products are registered as the data in the data head of the product name, even if all the data of this data head is not decidedly inputted, the status can be decided every data. In addition, in the notice board constituted by a plurality of records, the status may be judged on the basis of the combination of the states of the records. Thus, it is considered that even in the same data head, the form in which the data is decided varies depending on the user. Then, in the present embodiment, the flexibility is given to the change in the status of the notice board for the decision of the data so that the flexible working corresponding to the actual business form can be carried out.

FIG. 23 is a block diagram showing a configuration of the business processing system of a third embodiment according to the present invention. The business processing system in the present embodiment has basically the same configuration as that of the second embodiment except that the structure of a status change rule 27 and the part of the function which is realized by a status watcher 5 are different from those of the second embodiment. Therefore, in the present embodiment, the description will hereinbelow be given by applying the same reference numerals which were used in the second embodiment to the parts which are common with those in the second embodiment.

FIG. 24 is a schematic view showing the data form of the status change rule 27 in the present embodiment. In the status change rule 27 in the present embodiment, the data heads which need to be decided in order to carry out the business of the task process are defined every task process. In FIG. 24, there is shown the status change rule 27 which is defined with respect to the business which is progressed using the notice board identified with the notice board number "001". Incidentally, the status change rule 27 shows the task by which task process the status can change to, and hence is different from both the status change rule 12 of the first embodiment and the status change rule 20 of the second embodiment in which the conditions required for changing the task process from the current task process to the next task process are defined. In FIG. 24, the task processes in the business are registered in a task process 271. The notice board number of the notice board in which the change status is defined is registrated in a notice board number 272. Status definition columns 273 to 277 correspond to the data heads of the notice board business system database 18. The status which in the task processes, the data of the corresponding data head must fulfill in order to carry out the business of the task process of interest is set to the associated status definition column. With respect to the status definition column to which "-" is set, there is shown the fact that the data of the data head of interest does not need to be decided in order to execute the processing in the corresponding task process. In the case where the data head having a plurality of data to be inputted thereto is present, when with respect to the data head required for the task, all of a plurality of data of that data head should be decided, "ALL" is set to the associated status definition column. In the case where any one of the data of the data head has only to be decided, "EACH" is set to the status definition column. In addition, in the case where with respect to the data head having only one data given thereto, the one data needs to be decided, "ALL" is set to the status definition column. Incidentally, with respect to the data head having only one data given thereto, for the purpose of distinguishing this data head from the data head having a plurality of data given thereto, in order to show that the data of interest needs to be decided, for example, the information such as "decided" may also be set. In the example shown in FIG. 24, since the task process of "deal" is the first task process out of a series of businesses and hence the business is carried out with all the data being undecided, "-" is set to the status definition columns 273 to 277 with respect to all the data heads. In addition, the task process of "stock confirmation" defines that with respect to any one of the products, in addition to the consumer's name (it is assumed that in one notice board, only one data is given to "consumer's name"), its product name and amount have only to be decided. Therefore, "ALL" is set to the status definition column 273 corresponding to the consumer's name, while "EACH" is set to each of the status definition columns 274 and 275 corresponding to the product name and the amount. In addition, since in the task process of "price estimation", the data needs to be decided in the data heads other than the appointed delivery day, "ALL" is set to each of the status definition columns 273 to 276 other than the status definition column 277 corresponding to the appointed delivery day.

Incidentally, the status change value 27 of the present embodiment is limited, with respect to the status change of the task process, to the definition of the conditions required therefor, and hence it is impossible to obtain the hysteresis of inputting/updating the data to/in the notice board business database. If it is required to obtain the hysteresis, as in the embodiment already described above, the inputted data and the attribute information corresponding to its data head are enabled to be registered every data head, thereby being able to cope therewith. Or, the file for obtaining the hysteresis may also be specially prepared.

Figure 25:
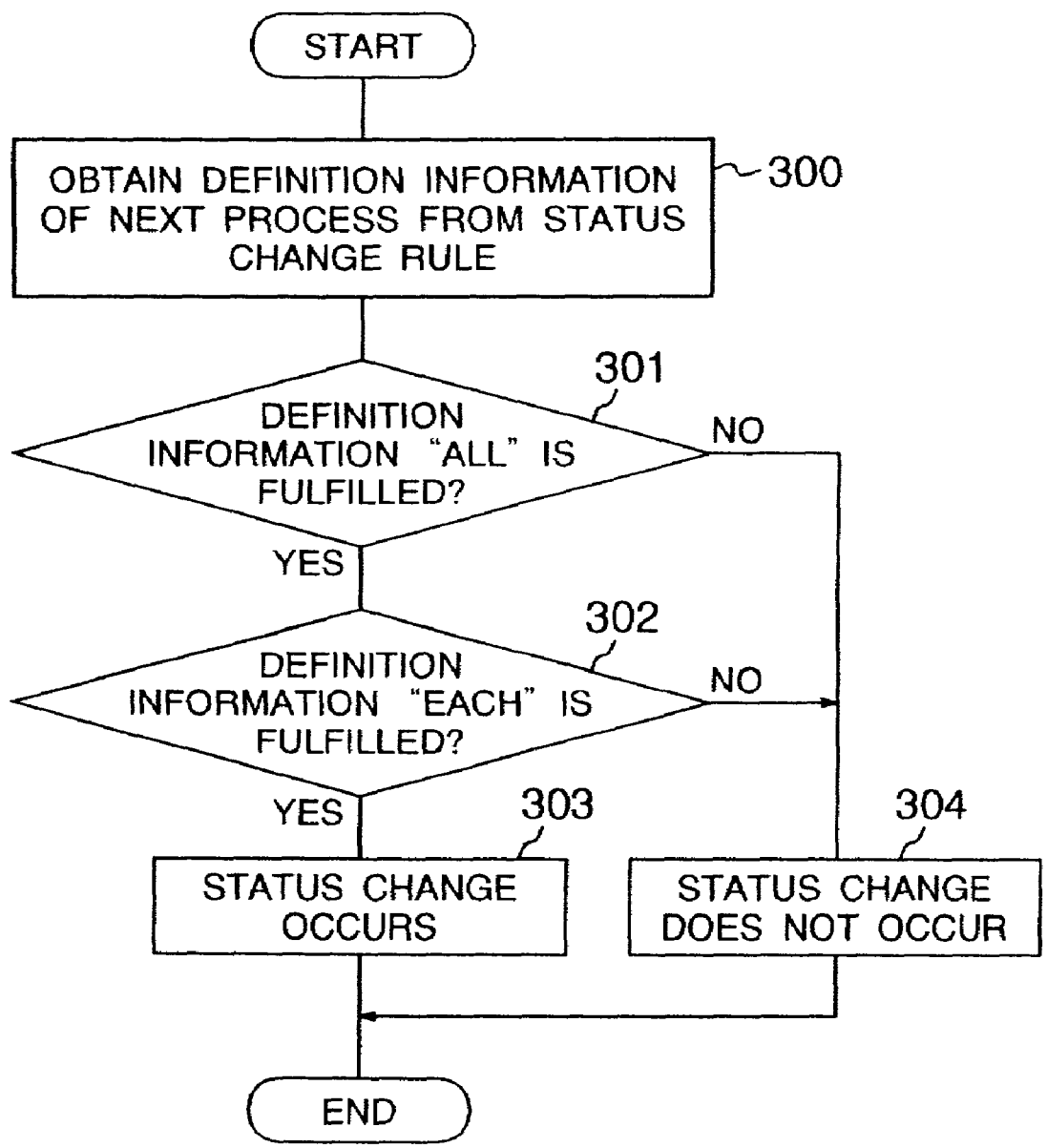
FIG. 25 is a flow chart showing the processing of judging whether or not the change in status occurs.

The processings which are executed in the present embodiment by the status watcher 5 are approximately the same as those which are executed in the second embodiment by the status watcher 4 except for the following two points. The judgement processing is different therefrom which is executed in the processing (Step 39) of judging whether or not the status change occurs. In addition, since the hysteresis is not left in the status change value 27, the processing of updating the status change rule (Step 37) is not executed at all. FIG. 25 shows a flow chart of the processing of judging whether or not the status change occurs which processing is executed by the status watcher 5 in the present embodiment. The status watcher 5 makes reference to the status change rule 27 to obtain the definition information with respect to the task process next to the current task process (Step 300). It is judged whether or not all the data is decided with respect to each of the data heads, to which "ALL" is set, out of the obtained definition information (Step 301). If all the data is decided with respect to each of the data heads to which "ALL" is set, then it is judged whether or not the definition information is fulfilled with respect to the data head in which "EACH" is defined as the definition information. More specifically, it is checked whether or not there is the record, in which all the data is decided with respect to each of the data heads to which "EACH" is set by the status change rule 27, out of the records of the notice board business system database. If such a record is present, then the definition information "EACH" is fulfilled (Step 302). Since if the definition information "EACH" is also fulfilled, then the status change to the next task process is possible, the status change is judged to occur (Step 303). On the other hand, when it is judged in Step 301 or Step 302 that the condition is not fulfilled, it is judged that the status change does not occur (Step 304).

As described above, according to the third embodiment, how to make the change in the status can be finely set every data head. As a result, users can recognize the current work state every head or for the data of the data head contained in the head, and hence it is possible to promote more smoothly, comfortably the connection with other workers. Incidentally, in the above-mentioned embodiment, if the data stored in the notice board business system database is used with respect to the data head which is registrated in the status change limit rule, and the attribute information corresponding to the data head, then it is possible to remove the need of registrating the data in the status change limit rule. In this case, it is possible to omit the processing in Step 42. In addition, in the present embodiment, the procedure may also be adopted in which the notice board business system database holds the data which is inputted/updated by the business processing, and also the conference flag which is not updated in the business processing is provided separately from the notice board business system database.

While in the above-mentioned embodiment, the notice board business system database is given the information relating to the status in order to enable the current task process to be identified, the data may not be given to the notice board business system database. In this case, when there is need of being aware of the status, the procedure may be adopted in which the decided status of the data heads is checked on the basis of the attribute information in the notice board business system database, and as a result, the status change rule is referred to obtain the current status. In addition, in order to judge whether or not the status should be changed, in the stage before updating the notice board business system database on the basis of the data sent from the client, the status is obtained once and then is held. Then, in Step 39, the status which is obtained after having updated the notice board business system database is compared with the status which is held to judge whether or not the status change occurs.

As set forth hereinabove, according to the present invention, the contents of all the data heads relating to the business processing are opened in the form of a notice board business system database to all the related persons in charge of the task processes. Therefore, each of the persons in charge of the task processes can look at the progress of the business processing, and hence it is possible to improve greatly the task efficiency.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A business processing system, comprising:
   a first memory storing a database which holds, through a workflow of a business processing including a sequence of a plurality of task processes, a plurality of data items which are inputted in the course of a business processing through terminal units by persons in charge of said task processes, said database being a notice board type database open to said persons in charge of said task processes;
   a second memory storing a status change rule which defines input conditions of said data items necessary for each of said task processes to be allowed to change to another task process; and
   an information processor that accesses said first memory and said second memory, receives a data input request for inputting a data item from a terminal unit to said database, updates, in response to said data input request, the corresponding data item in said database; and
   judges, based on said input conditions of said data items in said status change rule, whether or not a change of a current task process to another task process is possible.

2. A business processing system according to claim 1, wherein said database has degree information indicating whether the degree of the inputted data is decided or undecided, and
   wherein said information processor judges, when all the data items for which the data input should be completed by said status change rule has come decided, that a task process can change from the current task process to a next task process.

3. A business processing system according to claim 1, wherein said database further holds an identifier of the current task process, and
   wherein said information processor updates the identifier from the identifier of the current task process to an identifier of process which can be newly carried out.

* * * * *